US009552205B2

(12) United States Patent
Ermolaev et al.

(10) Patent No.: US 9,552,205 B2
(45) Date of Patent: Jan. 24, 2017

(54) VECTOR INDEXED MEMORY ACCESS PLUS ARITHMETIC AND/OR LOGICAL OPERATION PROCESSORS, METHODS, SYSTEMS, AND INSTRUCTIONS

(71) Applicant: Intel Corporation, Santa Clara, CA (US)

(72) Inventors: Igor Ermolaev, Nizhny Novgorod (RU); Bret L. Toll, Hillsboro, OR (US); Robert Valentine, Kiryat Tivon (IL); Jesus Corbal San Adrian, Barcelona (ES); Gautam B. Doshi, Bangalore (IN); Rama Kishan V. Malladi, Bangalore (IN); Prasenjit Chakraborty, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 377 days.

(21) Appl. No.: 14/040,409

(22) Filed: Sep. 27, 2013

(65) Prior Publication Data

US 2015/0095623 A1    Apr. 2, 2015

(51) Int. Cl.
*G06F 15/80* (2006.01)
*G06F 9/302* (2006.01)
(Continued)

(52) U.S. Cl.
CPC ......... *G06F 9/30036* (2013.01); *G06F 9/3004* (2013.01); *G06F 9/30043* (2013.01);
(Continued)

(58) Field of Classification Search
CPC G06F 9/30036; G06F 9/3004; G06F 9/30043; G06F 9/30047; G06F 9/30112; G06F 9/3012; G06F 9/3863; G06F 9/3885; G06F 9/3887; G06F 15/8007; G06F 2212/454
See application file for complete search history.

(56) References Cited

U.S. PATENT DOCUMENTS 4,651,274 A    3/1987 Omoda et al.
5,752,001 A *  5/1998 Dulong ............................ 703/2
(Continued)

FOREIGN PATENT DOCUMENTS

RU    2005132924 A    4/2007
RU    2010138178 A    3/2012
WO    2015/048825 A1    4/2015

OTHER PUBLICATIONS

International Search Report and Written Opinion received for PCT Patent Application No. PCT/US2014/059126, mailed on Nov. 28, 2014, 10 pages.
(Continued)

*Primary Examiner* — Daniel Pan
(74) *Attorney, Agent, or Firm* — Vecchia Patent Agent, LLC

(57) ABSTRACT

A processor including a decode unit to receive a vector indexed load plus arithmetic and/or logical (A/L) operation plus store instruction. The instruction is to indicate a source packed memory indices operand that is to have a plurality of packed memory indices. The instruction is also to indicate a source packed data operand that is to have a plurality of packed data elements. The processor also includes an execution unit coupled with the decode unit. The execution unit, in response to the instruction, is to load a plurality of data elements from memory locations corresponding to the plurality of packed memory indices, perform A/L operations on the plurality of packed data elements of the source packed data operand and the loaded plurality of data elements, and store a plurality of result data elements in the memory
(Continued)

locations corresponding to the plurality of packed memory indices.

25 Claims, 24 Drawing Sheets

(51) Int. Cl.
    *G06F 9/305*      (2006.01)
    *G06F 9/312*      (2006.01)
    *G06F 9/315*      (2006.01)
    *G06F 9/30*      (2006.01)
    *G06F 9/38*      (2006.01)

(52) U.S. Cl.
    CPC ...... *G06F 9/30032* (2013.01); *G06F 9/30047* (2013.01); *G06F 9/3887* (2013.01); *G06F 15/8007* (2013.01); *G06F 2212/454* (2013.01)

(56) References Cited

U.S. PATENT DOCUMENTS

| | | | | |
|---|---|---|---|---|
| 8,028,152 | B2 * | 9/2011 | Glew | 712/220 |
| 2004/0153623 | A1 | 8/2004 | Buchty et al. | |
| 2007/0223629 | A1 * | 9/2007 | Zeng et al. | 375/341 |
| 2008/0104364 | A1 | 5/2008 | Buchty et al. | |
| 2009/0100247 | A1 | 4/2009 | Moyer et al. | |
| 2009/0172348 | A1 * | 7/2009 | Cavin | 712/4 |
| 2009/0249026 | A1 * | 10/2009 | Smelyanskiy et al. | 712/4 |
| 2010/0318773 | A1 | 12/2010 | Greyzck et al. | |
| 2011/0320766 | A1 * | 12/2011 | Wu et al. | 712/28 |
| 2012/0060020 | A1 | 3/2012 | Gonion et al. | |
| 2012/0166511 | A1 * | 6/2012 | Hiremath et al. | 708/622 |
| 2012/0216011 | A1 * | 8/2012 | Gove et al. | 712/7 |

OTHER PUBLICATIONS

Office Action received for Taiwan Patent Application No. 103132771, mailed on Jan. 21, 2015, 1 page of English Translation of Search Report and 12 pages of Taiwan Office Action.

International Preliminary Report on Patentability and Written Opinion Received for PCT Patent Application No. PCT/US2014/059126, mailed on Apr. 7, 2016, 7 pages.

Office Action received for Korean Patent Application No. 10-2016-7005276, mailed on Jul. 19, 2016, 6 pages of Korean Office Action including 3 pages of English Translation.

Notice of Allowance received for Taiwan Patent Application No. 103132771, mailed on Sep. 20, 2016, 3 pages of Taiwan Notice of Allowance including 1 page of English Translation.

Offce Action received for Russian Federation Patent Application No. 2016107015128(011116), mailed on Sep. 20, 2016, 8 pages of Russian Office Action including 2 pages of English Translation.

\* cited by examiner

*FIG. 4*

A METHOD IN A
PROCESSOR
460

RECEIVE VECTOR INDEXED LOAD PLUS ARITHMETIC AND/OR LOGICAL (A/L) OPERATION PLUS STORE INSTRUCTION INDICATING SOURCE PACKED MEMORY INDICES OPERAND THAT IS TO HAVE PLURALITY OF PACKED MEMORY INDICES, AND INDICATING SOURCE PACKED DATA OPERAND THAT IS TO HAVE PLURALITY OF PACKED DATA ELEMENTS — 461

PERFORM VECTOR INDEXED LOAD PLUS A/L OPERATION PLUS STORE INSTRUCTION — 462

LOAD PLURALITY OF DATA ELEMENTS FROM MEMORY LOCATIONS CORRESPONDING TO PLURALITY OF PACKED MEMORY INDICES — 463

PERFORM A/L OPERATIONS ON PLURALITY OF PACKED DATA ELEMENTS OF SOURCE PACKED DATA OPERAND AND LOADED PLURALITY OF DATA ELEMENTS — 464

STORE PLURALITY OF RESULT DATA ELEMENTS IN MEMORY LOCATIONS CORRESPONDING TO PLURALITY OF PACKED MEMORY INDICES — 465

FIG. 5
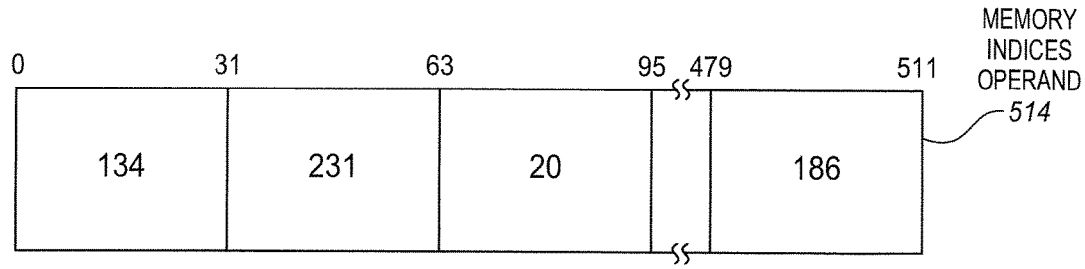
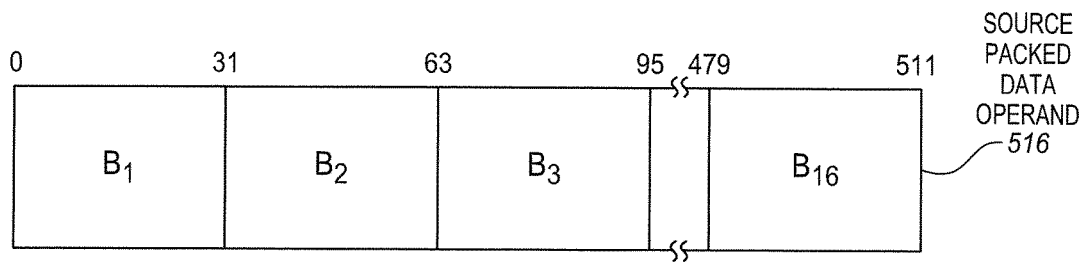
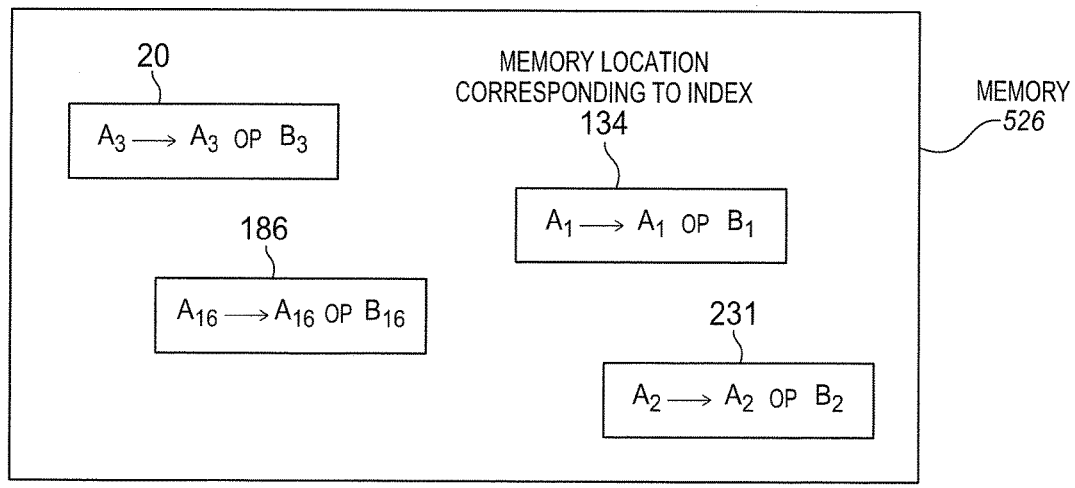

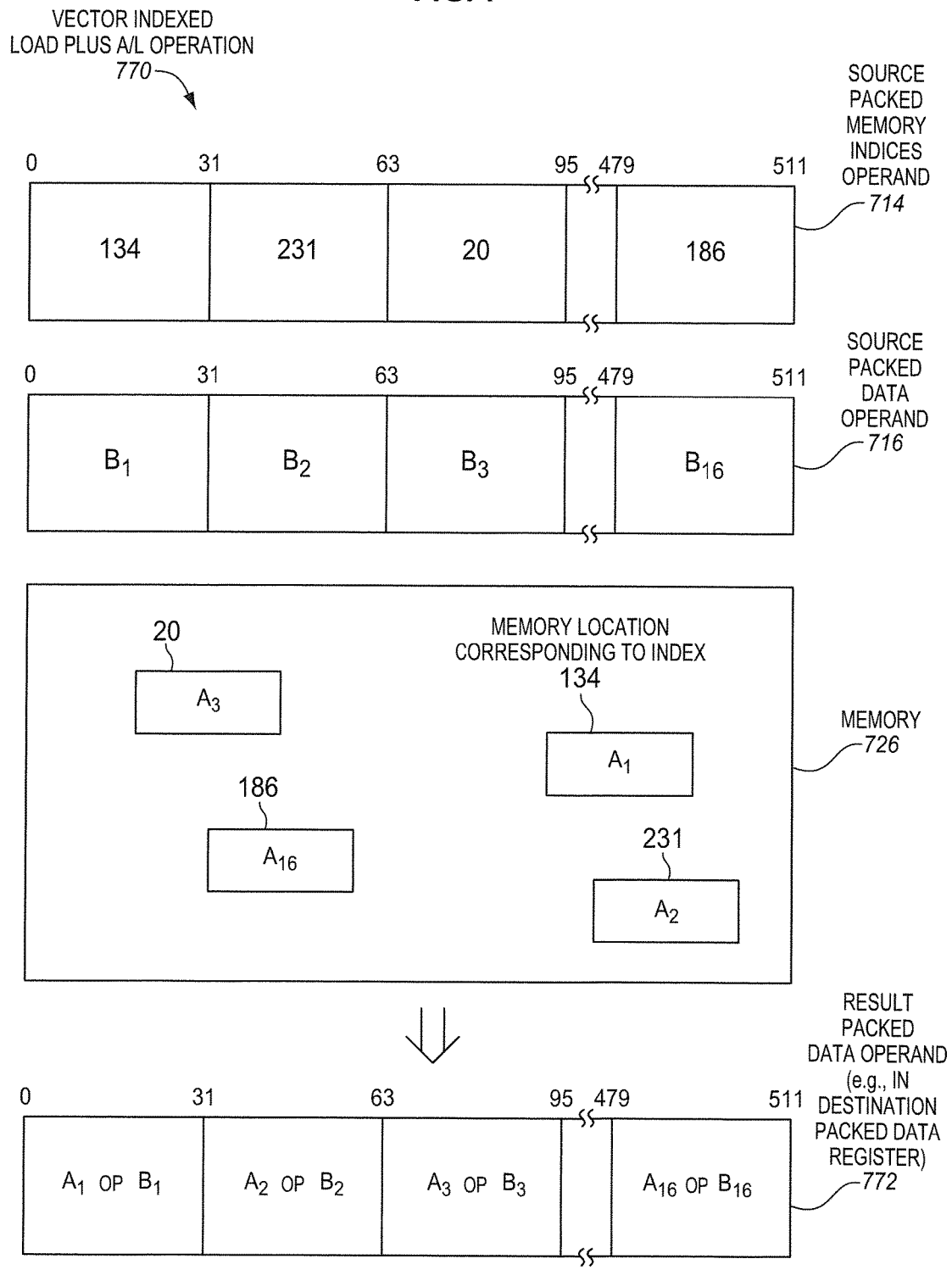

FIG. 8

VECTOR INDEXED LOAD PLUS
A/L OPERATION PLUS
STORE OPERATION
806

| OPCODE | SOURCE PACKED MEMORY INDICES FIELD | SOURCE PACKED DATA FIELD | SOURCE PACKED DATA OPERATION MASK FILED (OPTIONAL) | SOURCE OF MEMORY ADDRESSING INFORMATION (OPTIONAL) |
|---|---|---|---|---|
| 880 | 881 | 882 | 883 | 885 |

FIG. 9

VECTOR INDEXED LOAD PLUS
A/L OPERATION INSTRUCTION
908

| OPCODE | SOURCE PACKED MEMORY INDICES FIELD | SOURCE PACKED DATA FIELD | SOURCE PACKED DATA OPERATION MASK FIELD (OPTIONAL) | DESTINATION PACKED DATA FIELD (OPTIONAL) | SOURCE OF MEMORY ADDRESSING INFORMATION (OPTIONAL) |
|---|---|---|---|---|---|
| 980 | 981 | 982 | 983 | 984 | 985 |

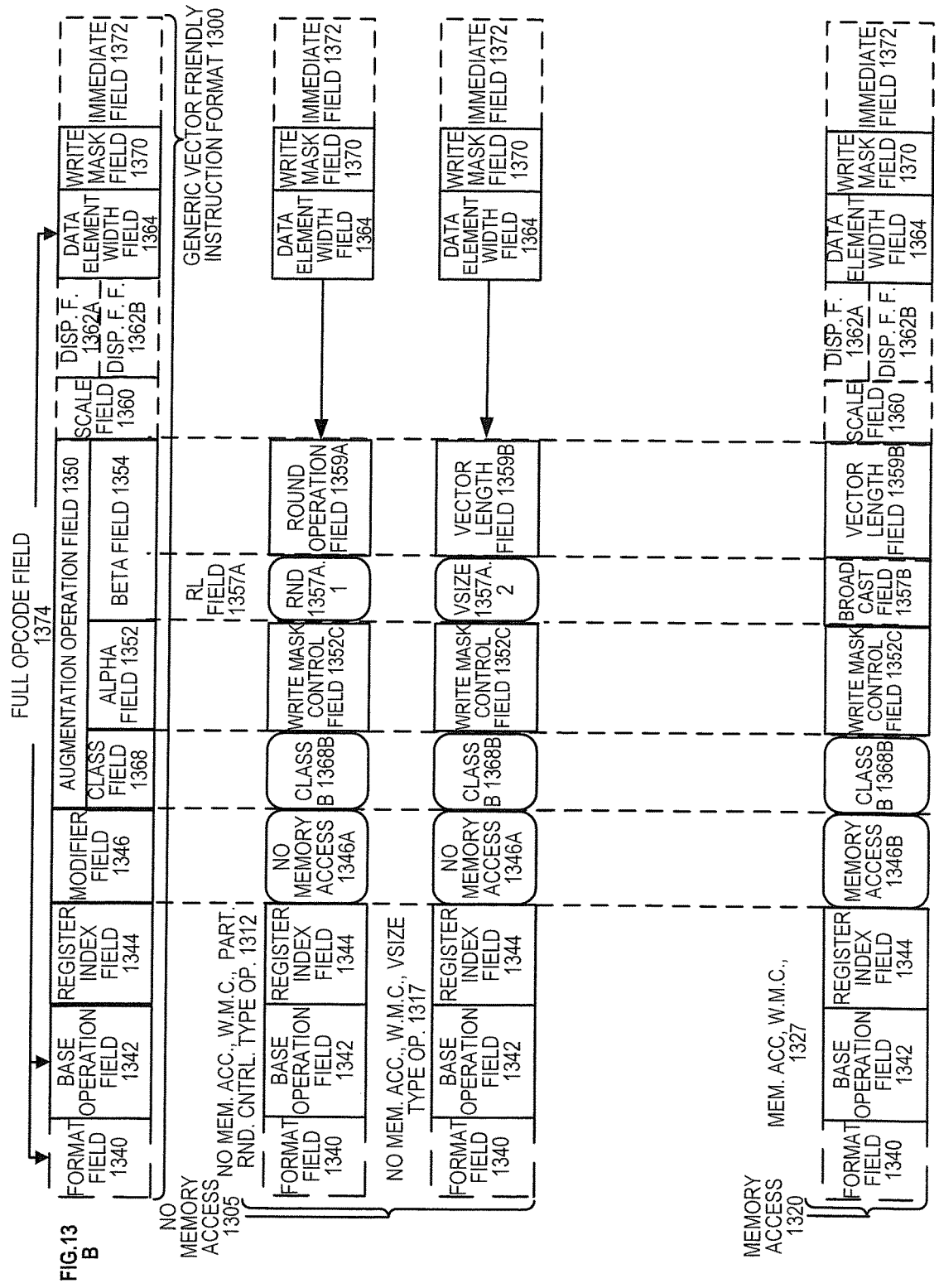

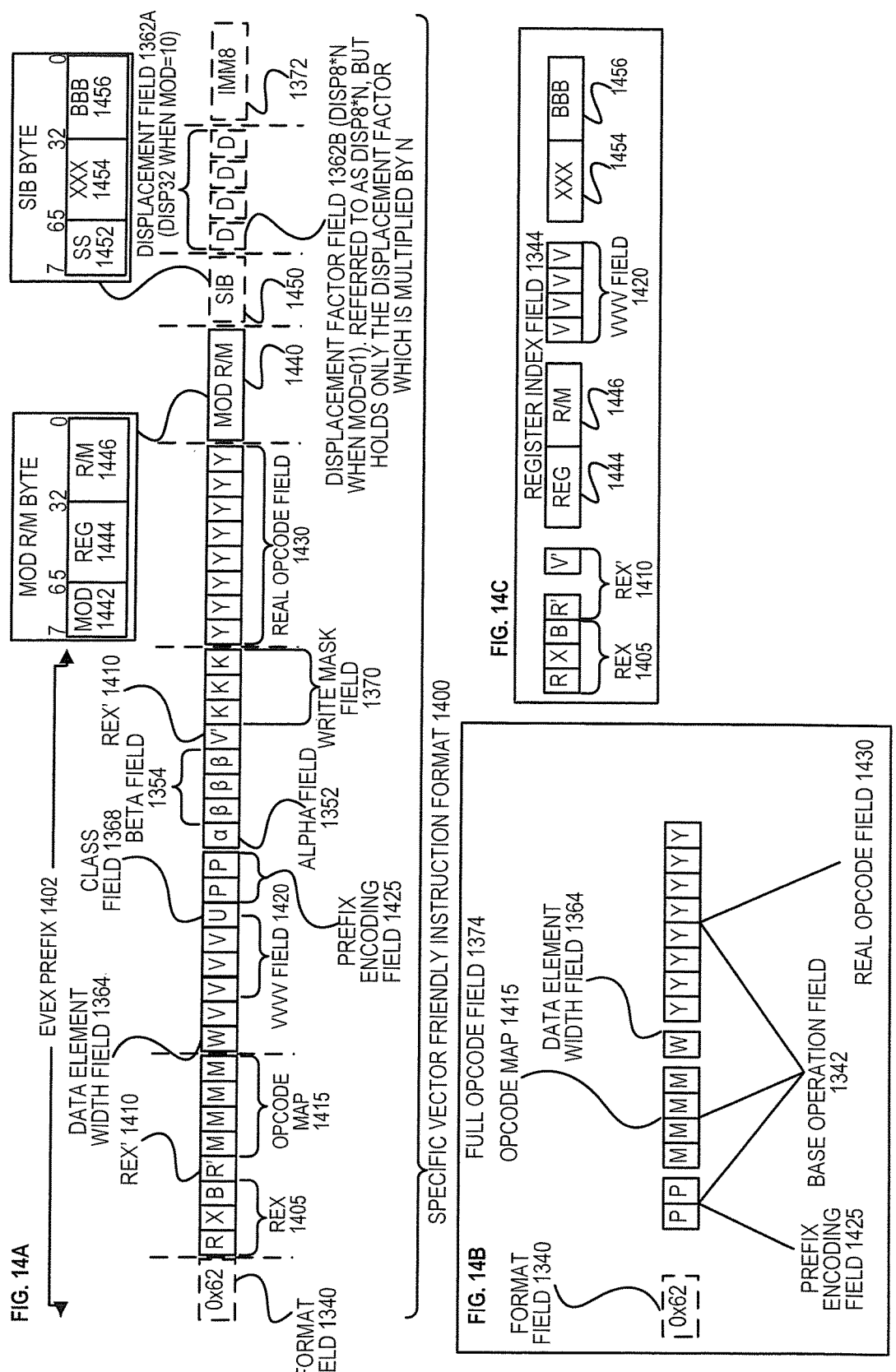

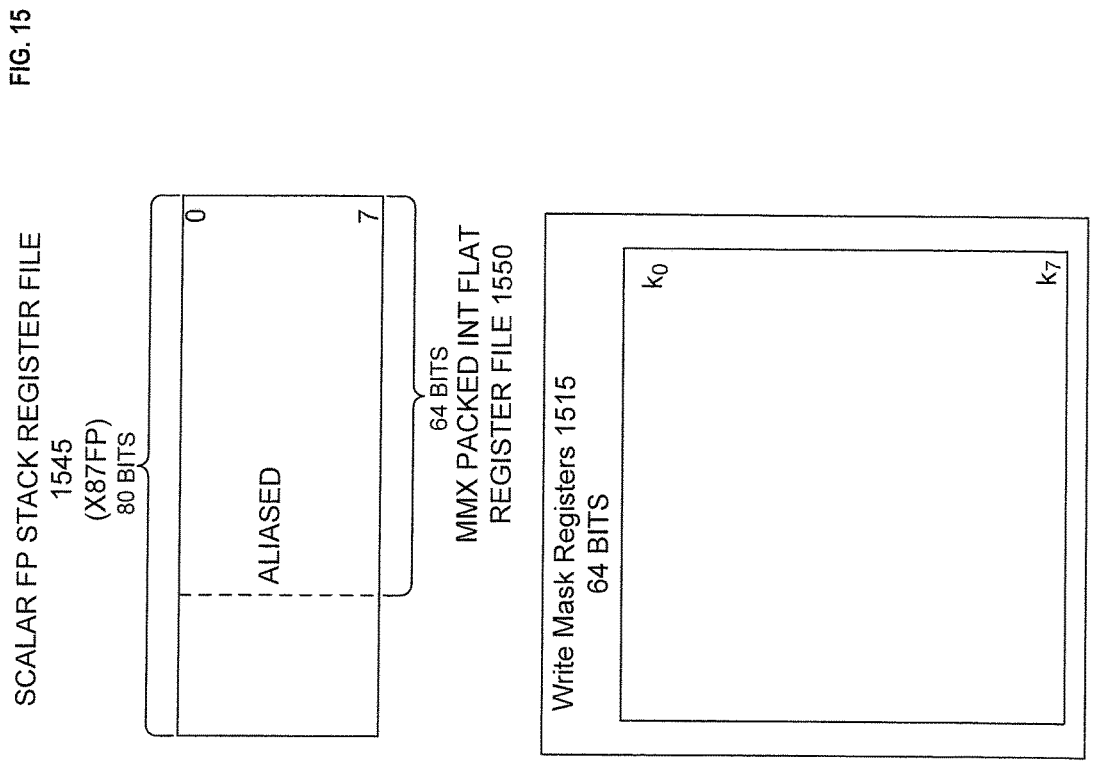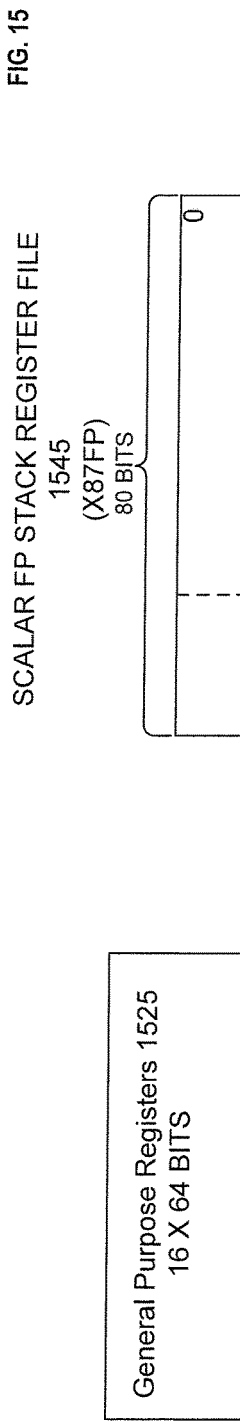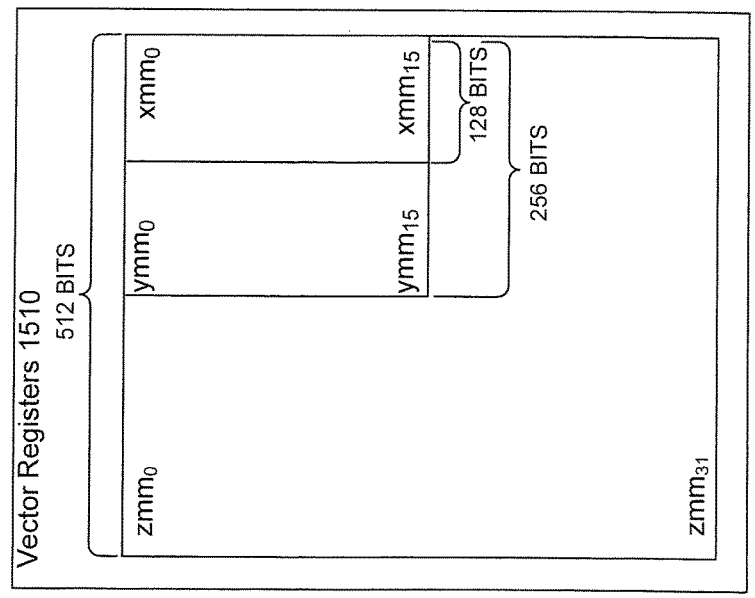
FIG. 15

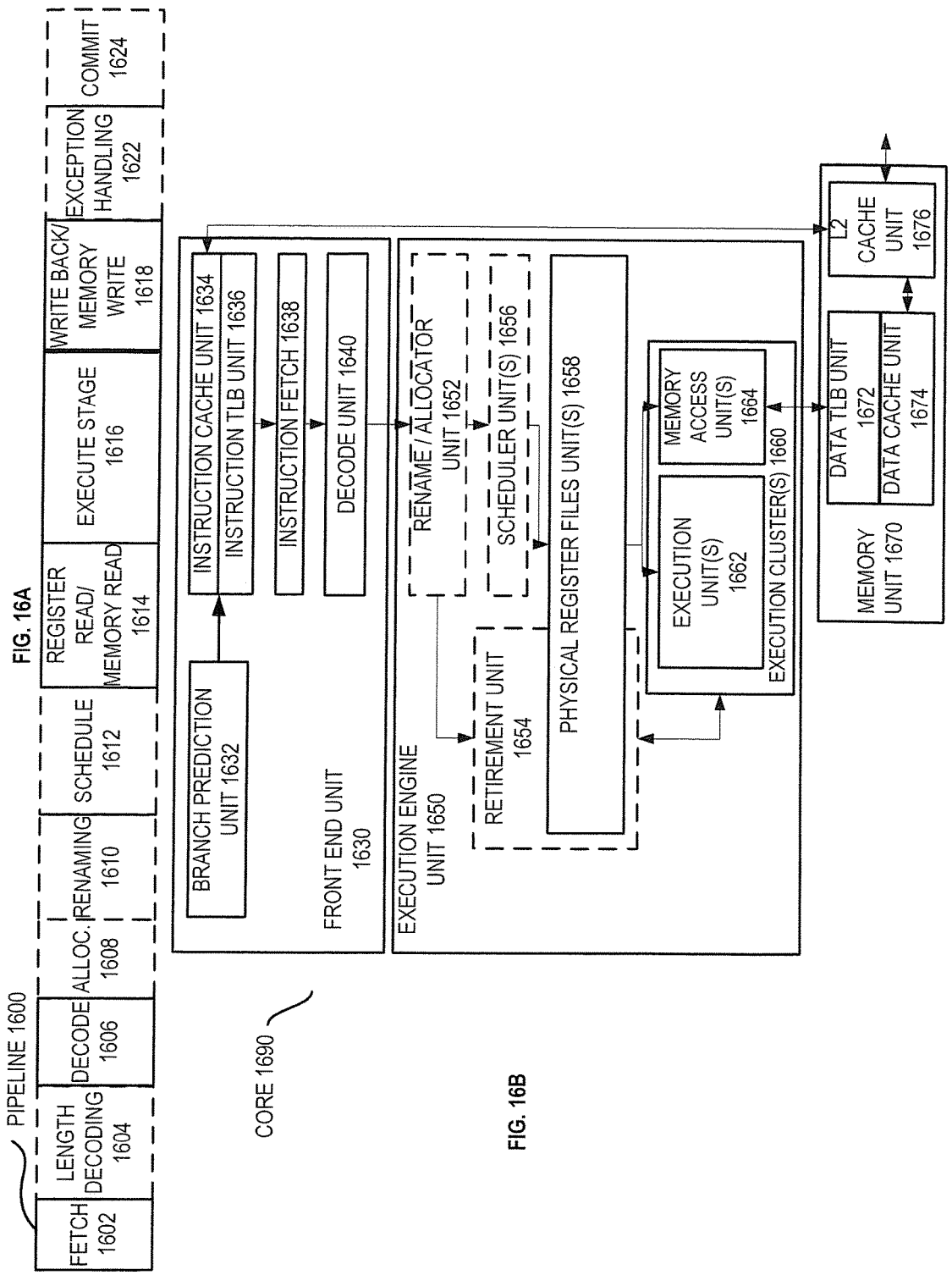

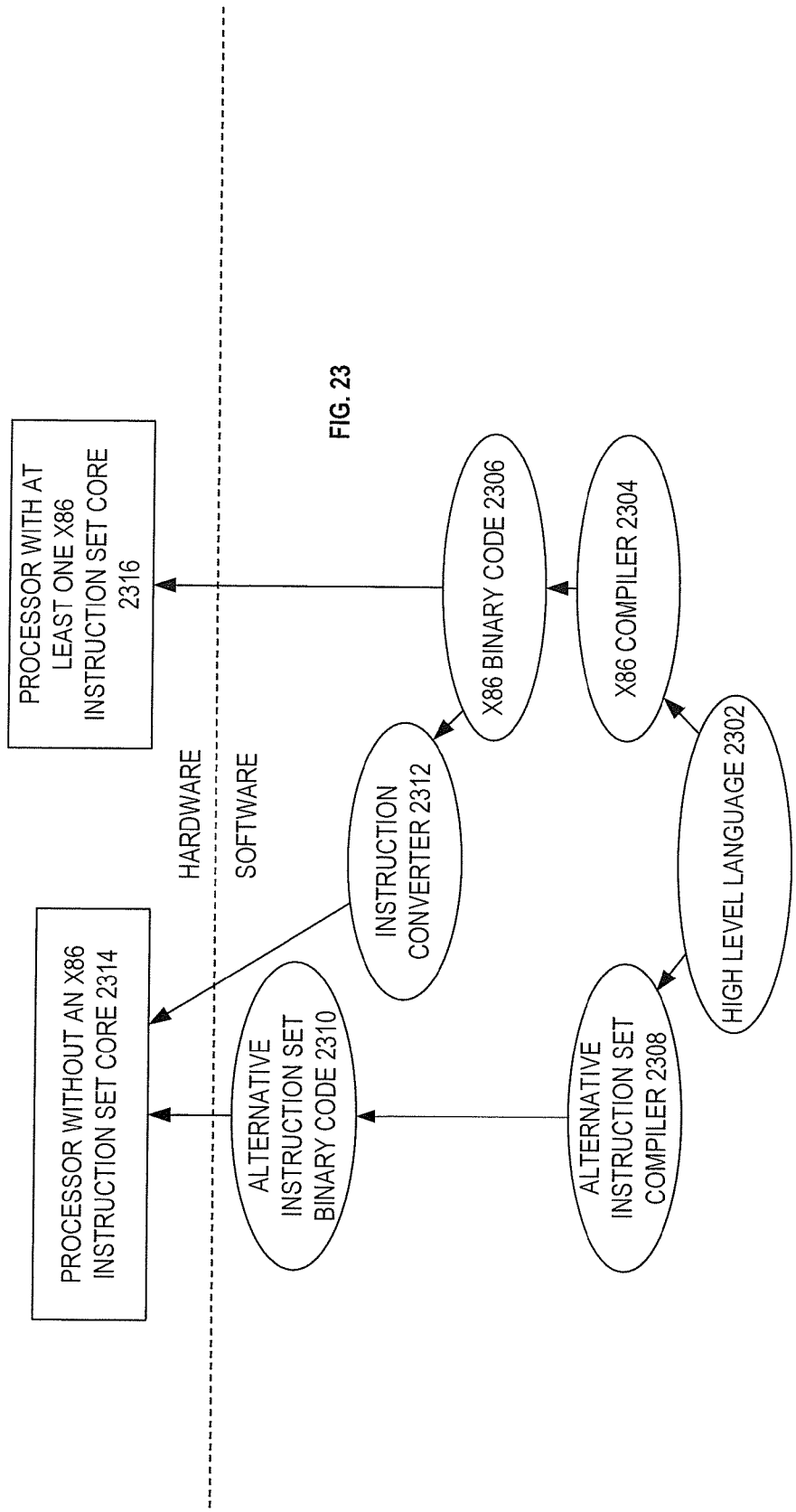

VECTOR INDEXED MEMORY ACCESS PLUS ARITHMETIC AND/OR LOGICAL OPERATION PROCESSORS, METHODS, SYSTEMS, AND INSTRUCTIONS

BACKGROUND

Technical Field

Embodiments described herein generally relate to microprocessors. In particular, embodiments described herein generally relate to accessing memory with microprocessors in response to instructions.

Background Information

Processors are commonly operable to execute instructions to access system memory. For example, processors may execute load instructions to load or read data from the system memory and/or store instructions to store or write data to the system memory.

Certain processors are operable to execute vector indexed load instructions (e.g., to load a vector of elements using a vector of indices). These vector indexed load instructions are also referred to in the arts as vector gather instructions or simply gather instructions. Intel® Advanced Vector Extensions Programming Reference, document reference number 319433-011, published June 2011, describes several vector gather (VGATHER) instructions. Examples include VGATHERDPD, VGATHERQPD, VGATHERDPS, VGATHERQPS, VPGATHERDD, VPGATHERQD, VPGATHERDQ, and VPGATHERQQ. These gather instructions may be used to gather or load multiple data elements from memory using multiple corresponding memory indices.

Certain processors are operable to execute vector indexed store instructions (e.g., to store a vector of elements using a vector of indices). These vector indexed store instructions are also referred to in the arts as vector scatter instructions or simply scatter instructions. Intel® Architecture Instruction Set Extensions Programming Reference, document reference number 319433-015, published July 2013, describes several vector scatter (VSCATTER) instructions. These scatter instructions may be used to scatter or store multiple data elements from a source operand to system memory using multiple corresponding memory indices.

BRIEF DESCRIPTION OF THE DRAWINGS

The invention may best be understood by referring to the following description and accompanying drawings that are used to illustrate embodiments. In the drawings:

FIG. 4 is a block flow diagram of an embodiment of a method of processing an embodiment of a vector indexed load plus arithmetic and/or logical operation plus store instruction.

FIG. 5 is a block diagram illustrating an embodiment of a vector indexed load plus arithmetic and/or logical operation plus store operation.

FIG. 7 is a block diagram illustrating an embodiment of a vector indexed load plus arithmetic and/or logical operation.

FIG. 8 is a block diagram of an embodiment of a format for a vector indexed load plus arithmetic and/or logical operation plus store instruction.

FIG. 9 is a block diagram of an embodiment of a format for a vector indexed load plus arithmetic and/or logical operation instruction.

FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention.

FIG. 14A is a block diagram illustrating an exemplary specific vector friendly instruction format according to embodiments of the invention.

FIG. 14B is a block diagram illustrating the fields of the specific vector friendly instruction format that make up the full opcode field according to one embodiment of the invention.

FIG. 14C is a block diagram illustrating the fields of the specific vector friendly instruction format that make up the register index field according to one embodiment of the invention.

FIG. 15 is a block diagram of a register architecture according to one embodiment of the invention.

FIG. 16A is a block diagram illustrating both an exemplary in-order pipeline and an exemplary register renaming, out-of-order issue/execution pipeline according to embodiments of the invention.

FIG. 16B shows processor core including a front end unit coupled to an execution engine unit, and both are coupled to a memory unit.

FIG. 23 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are vector indexed memory access plus arithmetic and/or logical (A/L) operation instructions, processors to execute such instructions, methods performed by the processors when processing or executing such instructions, and systems incorporating one or more processors to process or execute such instructions. In the following description, numerous specific details are set forth (e.g., specific instruction operations, data formats, processor configurations, microarchitectural details, system configurations, instruction formats, sequences of operations, etc.). However, embodiments may be practiced without these specific details. In other instances, well-known circuits, structures and techniques have not been shown in detail to avoid obscuring the understanding of the description.

Figure 1:
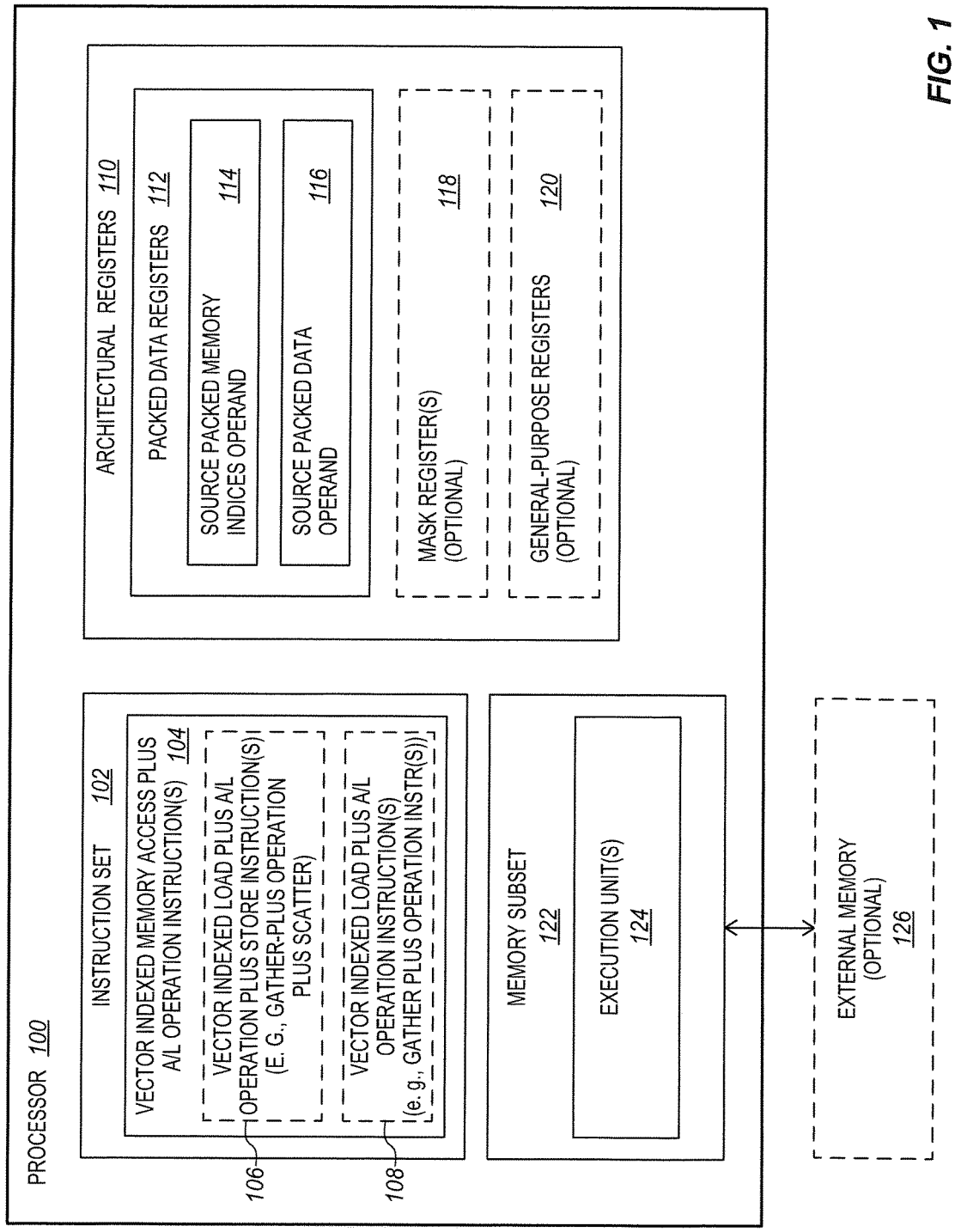
FIG. 1 is a block diagram of an embodiment of a processor that is operable to execute one or more vector indexed memory access plus arithmetic and/or logical operation instructions.

FIG. 1 is a block diagram of an embodiment of a processor 100 that is operable to perform or execute one or more vector indexed memory access plus arithmetic and/or logical (A/L) operation instruction(s) 104. The processor is coupled with an optional external memory 126 (e.g., a dynamic random access memory (DRAM), flash memory, other system memory, etc.). The memory 126 is shown as optional because some embodiments pertain to the processor 100 without the memory 126.

In some embodiments, the processor may be a general-purpose processor (e.g., of the type used in desktop, laptop, tablet, handheld, cellular phone, and like computing devices). Alternatively, the processor may be a special-purpose processor. Examples of suitable special-purpose processors include, but are not limited to, graphics processors, network processors, communications processors, cryptographic processors, coprocessors, and digital signal processors (DSPs), to name just a few examples. The processor may be any of various complex instruction set computing (CISC) processors, various reduced instruction set computing (RISC) processors, various very long instruction word (VLIW) processors, various hybrids thereof, or other types of processors entirely.

The processor includes architecturally-visible or architectural registers 110. The term architectural registers is often used in the art to refer to those registers that are visible to software (e.g., a programmer) and/or the registers that are specified by instructions of the instruction set to identify operands. These architectural registers are contrasted to other non-architectural or non-architecturally visible registers in a given microarchitecture (e.g., temporary registers used by instructions, etc.). For simplicity, these architectural registers will often be referred to herein simply as registers. The registers generally represent on-die processor storage locations. The registers may be implemented in different ways in different microarchitectures using well-known techniques, and are not limited to any particular type of circuit. Examples of suitable types of registers include, but are not limited to, dedicated physical registers, dynamically allocated physical registers using register renaming, and combinations thereof. The illustrated registers include a set of vector or packed data registers 112 that are each operable to store vector or packed data. In some embodiments, the registers may also optionally include packed data operation mask registers 118, although this is not required. In some embodiments, the registers may also include general-purpose registers 120, although this is not required.

The processor has an instruction set 102. The instruction set includes the set of instructions that are supported by the processor. The instructions of the instruction set represent assembly language instructions, machine-level instructions, macroinstructions or instructions provided to the processor for execution, as opposed to microinstructions, micro-ops, or instructions which result from a decode unit decoding macroinstructions and are provided to an execution unit for execution. The instruction set includes the one or more vector indexed memory access plus arithmetic and/or logical (A/L) operation instructions 104. Each of the one or more vector indexed memory access plus A/L operation instructions is operable to cause the processor to perform a vector indexed memory access operation in combination with a vector A/L operation.

In some embodiments, the one or more vector indexed memory access plus A/L operation instructions 104 may optionally include one or more vector indexed load plus A/L operation plus store instructions 106 (e.g., one or more gather plus A/L operation plus scatter instructions). By way of example, in some embodiments, a vector indexed load plus A/L operation plus store instruction 106 (e.g., a gather plus A/L operation plus scatter instruction) may be operable to cause the processor to gather data elements from memory locations in the external memory 126 indicated by a source packed memory indices operand 114, perform an A/L operation on the gathered data elements and data elements of a source packed data operand 116, and scatter the resulting data elements to the memory locations in the external memory 126 indicated by the source packed memory indices operand 114.

In some embodiments, the one or more vector indexed memory access plus A/L operation instructions 104 may optionally include one or more vector indexed load plus A/L operation instructions 108 (e.g., one or more gather plus A/L operation instructions). By way of example, in some embodiments, a vector indexed load plus A/L operation instruction 108 (e.g., a gather plus A/L operation instruction) may be operable to cause the processor to gather data elements from memory locations in the external memory 126 indicated by a source packed memory indices operand 114, perform an A/L operation on the gathered data elements and data elements of a source packed data operand 116, and store the resulting data elements as a result packed data in an on-processor storage location (e.g., in one or more packed data registers).

Various different types of vector A/L operations are suitable for the instructions 104. A few examples of suitable A/L operations include, but are not limited to, vector or packed addition operations, subtraction operations, multiplication operations, division operations, multiply-add operations, shift operations, rotate operations, logical AND operations, logical OR operations, logical NOT operations, logical AND NOT operations, averaging operations, maximum operations, minimum operations, and compare operations, to name just a few possible examples. In various embodiments, there may be anywhere from a single vector indexed memory access plus A/L operation instructions 104 up to many such different instructions. For example, there may be multiple or many gather plus operation plus scatter instructions for different types of A/L operations (e.g., add, multiply, shift, etc.) and/or multiple or many gather plus operation instructions for different types of A/L operations.

In some embodiments, the instructions 104 may optionally indicate a packed data operation mask operand in the mask registers 118, although this is not required. Packed data operation mask operands and packed data operation mask registers will be discussed further below. In some embodiments, the instructions 104 may optionally indicate (e.g., implicitly indicate) a general-purpose register 120 (e.g., one having a base address or other memory address information), although this is not required. Alternatively, the memory address information may be otherwise provided.

The processor also includes one or more execution units 124. The execution unit(s) are operable to execute or perform the vector indexed memory access plus A/L operation instruction(s) 104. Examples of suitable execution units include, but are not limited to, memory access units, memory execution units, gather units, scatter units, arithmetic and/or logical units (ALUs), and the like, and combinations thereof. In some embodiments, a memory execution unit (or other unit capable of performing a gather, scatter, or other vector indexed memory access operation) may be modified to include an arithmetic and/or logical unit or circuitry. In other embodiments, a memory execution unit (or other unit capable of performing a gather, scatter, or other vector indexed memory access operation) may be coupled with an A/L unit or circuitry. In some embodiments, the one or more execution units 124 may be included in a memory subsystem 122 that is used to access the external memory 126.

Figure 2:
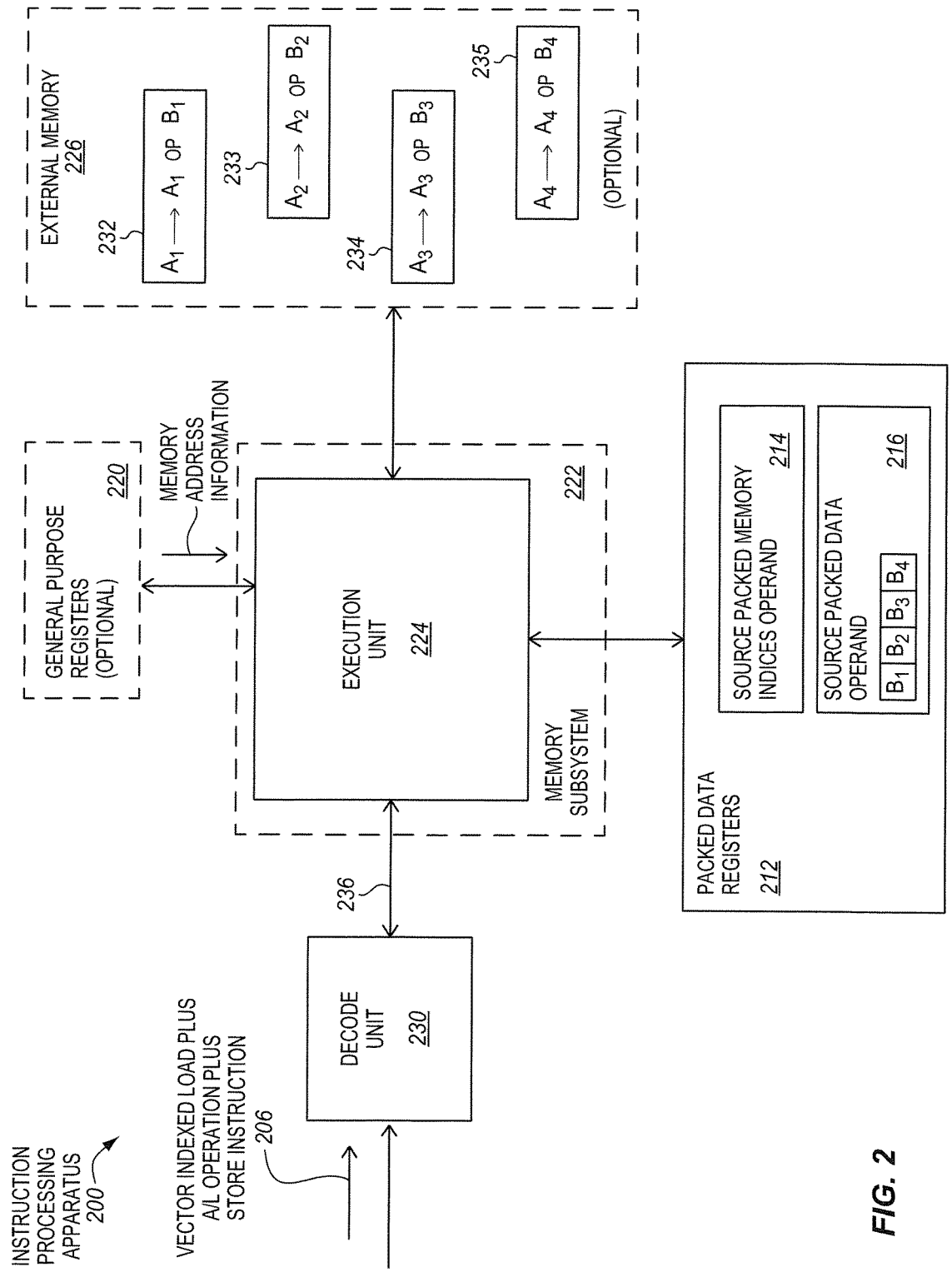
FIG. 2 is a block diagram of an embodiment of an instruction processing apparatus that is operable to execute one or more vector indexed memory access plus arithmetic and/or logical operation instructions.

FIG. 2 is a block diagram of an embodiment of an instruction processing apparatus 200. In some embodiments, the instruction processing apparatus 200 may be, or may be included in, the processor 100 of FIG. 1. The features and details described above for the processor 100 may also optionally apply to the instruction processing apparatus 200. Alternatively, the instruction processing apparatus 200 may be, or may be included in, a similar or different processor than the processor 100. Moreover, the processor 100 may include a similar or different instruction processing apparatus than the instruction processing apparatus 200.

The instruction processing apparatus 200 is coupled with an optional external memory 226 (e.g., a dynamic random access memory (DRAM), flash memory, other system memory, etc.). By way of example, the instruction processing apparatus and the external memory may be coupled by a bus or other interconnects on a printed circuit board, through a chipset, or by other approaches known in the arts. The external memory is shown as being optional because some embodiments pertain to the instruction processing apparatus without the external memory (e.g., prior to assembly of the processor into a system).

The instruction processing apparatus 200 may receive a vector indexed load plus A/L operation plus store instruction 206. For example, the instruction may be received from an instruction fetch unit, an instruction queue, a memory, etc. In some embodiments, the instruction 206 may represent a gather plus A/L operation plus scatter instruction. The instruction 206 may explicitly specify (e.g., through one or more bits or a field) or otherwise indicate (e.g., implicitly indicate, indicate indirectly through emulation register mapping, etc.) a source packed memory indices operand 214 having a plurality of packed memory indices. Each of the memory indices in the source packed memory indices operand may indicate a corresponding memory location in the external memory 226. In some embodiments, the memory indices may be 16-bit, 32-bit, or 64-bit memory indices, although the scope of the invention is not so limited. In some embodiments, the instruction 206 may also explicitly specify (e.g., through one or more bits or a field) or otherwise indicate (e.g., implicitly indicate, indicate indirectly through emulation register mapping, etc.) a source packed data operand 216 having a plurality of packed data elements.

The apparatus includes a set of packed data registers 212. The packed data registers may represent architectural registers. The registers may be implemented in different ways in different microarchitectures using well-known techniques, and are not limited to any particular type of circuit. Examples of suitable types of registers include, but are not limited to, dedicated physical registers, dynamically allocated physical registers using register renaming, and combinations thereof. As shown, in some embodiments, the source packed memory indices operand 214 and the source packed data operand 216 may be stored in registers of the packed data registers. By way of example, the instruction 206 may have one or more fields or a set of bits to specify these packed data registers as source operands. Alternatively, other storage locations may optionally be used for one or more of these operands.

The instruction processing apparatus 200 includes an instruction decode unit or decoder 230. In some embodiments, the decode unit may be located in a core. The decode unit may receive and decode higher-level machine instructions or macroinstructions (e.g., the instruction 206), and output one or more lower-level micro-operations, microcode entry points, microinstructions, or other lower-level instructions or control signals 236 that reflect and/or are derived from the original higher-level instruction. The one or more lower-level instructions or control signals may implement the operation of the higher-level instruction through one or more lower-level (e.g., circuit-level or hardware-level) operations. The decode unit may be implemented using various different mechanisms including, but not limited to, microcode read only memories (ROMs), look-up tables, hardware implementations, programmable logic arrays (PLAs), and other mechanisms known in the art. In other embodiments, instead of having the decode unit, an instruction emulator, translator, morpher, interpreter, or other instruction conversion logic (e.g., implemented in software, hardware, firmware, or a combination) may be used. In still other embodiments, a combination of instruction conversion logic (e.g., an emulation module) and a decode unit may be used. Some or all of the instruction conversion logic may potentially be located off-die from the rest of the instruction processing apparatus, such as on a separate die and/or in memory.

Referring again to FIG. 2, one or more execution units 224 are coupled with the decode unit 230, with the packed data registers 212, and with the external memory 226. In some embodiments, the one or more execution units may also optionally be coupled with general-purpose registers 220, which may optionally be used to store a base address and/or other memory address information to convert the memory indices into memory addresses. Alternatively, the memory address information may be provided otherwise.

The execution unit is operable, in response to and/or as a result of the vector indexed load plus A/L operation plus store instruction 206 (e.g., in response to one or more control signals 236 decoded or otherwise converted from the instruction 206, or in response to one or more control signals 236 decoded from one or more instructions used to emulate the instruction 206) to perform a vector indexed load operation plus A/L operation plus store operation. The load operation, the A/L operation, and the store operation may all represent vector operations. In some embodiments, the operation may involve the processor gathering or otherwise loading a plurality of data elements from potentially non-contiguous memory locations in the external memory 226 indicated by corresponding memory indices of the source packed memory indices operand 214, performing an A/L operation on the gathered or loaded data elements and associated data elements of the source packed data operand 216, and scatter or otherwise storing the resulting data elements to the corresponding memory locations in the external memory 226 indicated by the corresponding memory indices of the source packed memory indices operand 214.

In the illustrated example embodiment, a first memory location 232 initially includes a data element A1, a second memory location 233 initially includes a data element A2, a third memory location 234 initially includes a data element A3, and a fourth memory location 235 initially includes a data element A4. Each of these memory locations may respectively correspond to a first through a fourth memory indices of the source packed memory indices operand 214. The source packed data operand 216 includes respective corresponding data elements B1, B2, B3, and B4. As a result of performing the instruction, the data element A1 in the first memory location 232 may be overwritten with A1 operation (OP) B1, the data element A2 in the second memory location 233 may be overwritten with A2 OP B2, the data element A3 in the third memory location 234 may be overwritten with A3 OP B3, and the data element A4 in the fourth memory location 235 may be overwritten with A4 OP B4. In this example embodiment, the operation (OP) may represent any suitable "vertical" type of packed data operation, such as, for example, packed addition, packed subtraction, packed multiplication, packed division, packed multiply-add, packed shift (e.g., shifting A1 by B1, shifting A2 by B2, etc.), packed rotate (e.g., rotating A1 by B1, rotating A2 by B2, etc.), packed logical AND, packed logical OR, packed logical NOT, packed logical AND NOT, packed averaging, packed maximum, packed minimum, packed comparison, or the like. Although in this example, "vertical" operations are used in which the operation is performed on pairs of corresponding data elements (e.g., data elements in corresponding bit positions in the operands), such "vertical" type operations are not required. In other embodiments, other types of operations may be performed, such as, for example, "horizontal" type operations, part "horizontal" part "vertical" operations, operations involving more than just one data element, etc.

Examples of suitable execution units include, but are not limited to, memory access units, memory execution units, gather units, scatter units, arithmetic and/or logical units (ALUs), and the like, and combinations thereof. In some embodiments, a memory execution unit (or other unit capable of performing a gather and/or scatter and/or other vector indexed memory access operation) may be modified to include an arithmetic and/or logical unit or circuitry. In other embodiments, a memory execution unit (or other unit capable of performing a gather and/or scatter and/or other vector indexed memory access operation) may be coupled with an arithmetic and/or logical unit or circuitry. The one or more execution units and/or the apparatus may include specific or particular logic (e.g., circuitry, transistors, or other hardware potentially combined with software and/or firmware) operable to execute and/or process the instruction 206. In some embodiments, the one or more execution units may include at least some transistors, integrated circuitry, portion of an integrated circuit, or other circuitry or hardware.

In some embodiments, the one or more execution units 224 may be included in a memory subsystem 222 that is used to access the external memory 226, although this is not required. As will be discussed further below, generally the closer the one or more execution units 224 are to the external memory 226, the greater the efficiency. For example, this may be due in part to not needing to store data in one or more higher levels of cache and/or not needing to transmit data on interconnects all the way up to the highest level of cache and/or into a core.

To avoid obscuring the description, a simple instruction processing apparatus 200 has been described, although the instruction processing apparatus may optionally include one or more other conventional components. Examples of such conventional components include, but are not limited to, an instruction fetch unit, an instruction scheduling unit, a branch prediction unit, instruction and data caches, instruction and data translation lookaside buffers (TLB), prefetch buffers, microinstruction queues, microinstruction sequencers, bus interface units, a retirement/commit unit, a register renaming unit, and other components conventionally employed in processors. Moreover, embodiments may have multiple cores, logical processors, or execution engines having either the same or different instruction set and/or ISA. There are literally numerous different combinations and configurations of such components in processors, and embodiments are not limited to any particular such combination or configuration.

In some embodiments, the operation may be performed by an execution unit located outside of the cores (e.g., by an execution unit co-located with and/or proximate a last level of cache, a next to last level of cache, or one of the last levels of cache. In some embodiments, the operation may be performed by the execution unit on data provided or retrieved from the last level of cache, the next to last level of cache, or one of the last levels of cache. In some embodiments, the one or more execution units 224 may be logically deployed at a same memory hierarchy level as a last level cache (or one of the lowest levels of cache), as opposed to logically deploying the one or more execution units 224 at the highest level of cache (or one of the highest levels of cache). Generally, the more levels of cache between the highest level of cache and the memory hierarchy level at which the one or more execution units operate, the greater the efficiency. In some embodiments, the operation may be performed on data that bypasses all, or at least one or more, higher levels of cache that are higher than the cache from which the data is provided (e.g., the last level of cache). In such embodiments, the gathered or otherwise loaded data does not need to be transferred into any such higher levels of cache and/or into the core before it is operated on and then scattered or otherwise stored back to memory. Advantageously, avoiding the need to store such data in the higher levels of cache may help to free space in the higher levels of cache. This freed space may be used to store other data, which may help to improve performance. Moreover, in some embodiments, the operation may be performed on data held in temporary registers, as opposed to architectural registers. This may help to free the architectural registers so that they are available for use by other instructions. This may also help to improve performance (e.g., by helping to reduce swapping data in and out of registers, etc.). Furthermore, interconnect bandwidth and/or other resources that would otherwise be needed to transfer the data into the highest or higher levels of cache and/or into the core may also be reduced. Such interconnect bandwidth and/or other resources may be utilized for other purposes, which also may help to improve performance.

Figure 3:
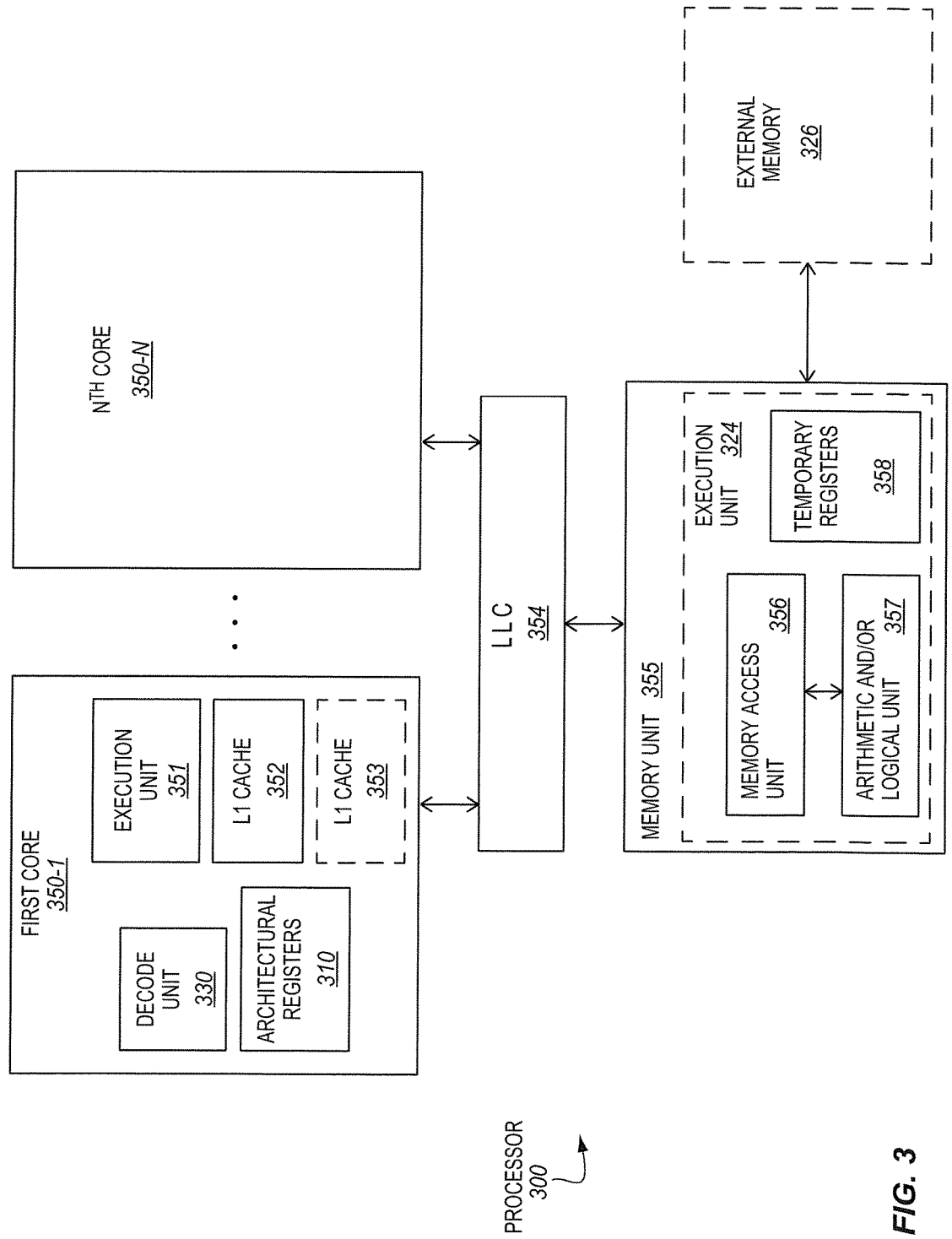
FIG. 3 is a block diagram illustrating one embodiment of a location of an execution unit in a processor.

FIG. 3 is a block diagram illustrating one embodiment of a location of an execution unit 324 in a processor 300. The processor includes one or more cores 350. In the illustration, the processor includes a first core 350-1 optionally through an Nth core 350-N, where N may represent any appropriate number of cores. The first core includes a decode unit 330, which may be similar to the decode units described elsewhere herein, and may decode an embodiment of a vector indexed memory access plus A/L operation instruction. The first core also includes an execution unit 351. The core also includes architectural registers 310 which may be indicated by instructions performed by the first core. The first core further includes a first level (L1) cache 352 and optionally a second level (L2) cache 353. The Nth core may optionally be similar to, or the same as, the first core, although this is not required. The processor also includes a last level cache (LLC) 354 coupled with the cores. The processor also includes a memory unit 355 coupled with the LLC and the cores. The memory unit is coupled with external memory 326.

In some embodiments, the memory unit may include the execution unit used to perform or execute an embodiment of a vector indexed memory access plus A/L operation instruction. The execution unit includes a memory access unit 356 that may be operable to perform a vector indexed memory access operation (e.g., a gather operation and/or a scatter operation). The execution unit also includes an A/L unit 357 coupled with the memory access unit. The A/L unit may be operable to perform an A/L operation on the accessed data (e.g., vector data loaded using the indexes). The memory access unit 356 and the A/L unit 357 may cooperate or work together to perform the embodiment of a vector indexed memory access plus A/L operation instruction. In some embodiments, the execution unit 324 may perform the operations on data loaded from the external memory 326 before it is loaded into LLC, as it is being loaded into LLC, or on data retrieved from the LLC after it has been loaded into LLC. In some embodiments, the execution unit 324 may perform the operations on data that has not made it to the cores 350, the L1 cache 352, or the L2 cache 353. In some embodiments, the execution unit may include temporary registers 358 to assist with performing these instructions. For example, the temporary registers may be used to store loaded data and/or intermediate or temporary data generated while performing the instructions. The use of such temporary registers helps to prevent needing to occupy the architectural registers 310.

FIG. 4 is a block flow diagram of an embodiment of a method 460 of processing an embodiment of a vector indexed load plus A/L operation plus store instruction. In various embodiments, the method may be performed by a general-purpose processor, special-purpose processor, or other instruction processing apparatus or digital logic device. In some embodiments, the operations and/or method of FIG. 4 may be performed by and/or within the apparatus of any of FIGS. 1-3. The components, features, and specific optional details described herein for the apparatus of FIGS. 1-3 also optionally apply to the operations and/or method of FIG. 4. Alternatively, the operations and/or method of FIG. 4 may be performed by and/or within a similar or different processor or apparatus. Moreover, the apparatus of any of FIGS. 1-3 may perform operations and/or methods the same as, similar to, or different than those of FIG. 4.

The method includes receiving the vector indexed load plus A/L operation plus store instruction, at block 461. In various aspects, the instruction may be received at a processor, an instruction processing apparatus, or a portion thereof (e.g., an instruction fetch unit, a decode unit, an instruction conversion module, etc.). In various aspects, the instruction may be received from an off-die source (e.g., from a DRAM, a disc, interconnect, etc.), or from an on-die source (e.g., from an instruction cache, from a fetch unit, etc.). In some embodiments, the instruction may specify or otherwise indicate a source packed memory indices operand that is to have a plurality of packed memory indices. In some embodiments, the instruction may specify or otherwise indicate a source packed data operand that is to have a plurality of packed data elements.

The method includes performing the vector indexed load plus A/L operation plus store instruction, at block 462. In some embodiments, this may include loading a plurality of data elements from memory locations corresponding to the plurality of packed memory indices, at block 463, performing A/L operations on the plurality of packed data elements of the source packed data operand and the loaded plurality of data elements, at block 464, and storing a plurality of result data elements in the memory locations corresponding to the plurality of packed memory indices, at block 465. The same indices used for the load operation may also be used for the store operation.

The illustrated method involves architecturally visible operations (e.g., those visible to software and/or a programmer). In other embodiments, the method may optionally include one or more microarchitectural operations. By way of example, the instruction may be fetched, decoded, scheduled out of order, source operands may be accessed, an execution unit may be enabled to perform and may perform microarchitectural operations to implement the operations of the instruction (e.g., a packed data may be stored from a cache to a temporary register, the packed data may be operated on from the temporary register, a result packed data may be stored from the temporary register back to the cache or to memory, etc.), etc.

FIG. 5 is a block diagram illustrating an embodiment of a vector indexed load operation plus A/L operation plus store operation 566 that may be performed in response to an embodiment of a vector indexed load plus A/L operation plus store instruction. In some embodiments, the instruction may represent a gather plus A/L operation plus scatter instruction.

The instruction may specify or otherwise indicate a source packed memory indices operand 514 having a plurality of packed memory indices. In the illustrated embodiment, the source packed memory indices operand is 512-bits wide and includes sixteen 32-bit memory indices, although the scope of the invention is not so limited. In the illustrated example, the values of the memory indices are, from the least significant position (on the left) to the most significant position (on the right), 134 in bits [31:0], 231 in bits [63:32], 20 in bits [95:64], and 186 in bits [511:480]. It is to be appreciated that these values are only illustrative examples. The main point is that there are values that indicate or correspond to different memory locations. Alternatively, other sized memory indices may optionally be used, such as, for example, 16-bit memory indices, 64-bit memory indices, or other sized memory indices known in the arts. Moreover, in other embodiments, the source packed memory indices operand may have another suitable width besides 512-bits, such as, for example, 64-bits, 128-bits, 256-bits, or 1024-bits.

The instruction may also specify or otherwise indicate a source packed data operand 516 having a plurality of packed data elements. In the illustrated embodiment, the source packed data operand is also 512-bits wide and includes sixteen 32-bit data elements, although the scope of the invention is not so limited. In the illustrated example, the values of the data elements are, from the least significant position (on the left) to the most significant position (on the right), B1 in bits [31:0], B2 in bits [63:32], B3 in bits [95:64], up through B16 in bits [511:480]. Alternatively, other sized data elements may optionally be used, such as, for example, 8-bit data elements, 16-bit data elements, 64-bit data elements, or other sized data elements known in the arts. Moreover, in other embodiments, the source packed data operand may have another suitable width besides 512-bits, such as, for example, 64-bits, 128-bits, 256-bits, or 1024-bits. There is no requirement that the bit-width of the memory indices be the same as the bit-width of the data elements. Often, the number of data elements will be the same as the number of memory indices, although this is not required depending upon the particular type of operation.

The vector indexed load operation, A/L operation, and store operation may be performed in response to and/or as a result of the embodiment of the masked instruction. The operation may gather or otherwise load data elements from memory locations in memory indicated by the corresponding memory indices of the source packed memory indices operand. Each memory index may point to or indicate a corresponding memory location and/or a data element stored therein. For example, in the illustrated embodiment, the memory index 134 may indicate the memory location that stores data element A1, the memory index 231 may indicate the memory location that stores data element A2, the memory index 20 may indicate the memory location that stores data element A3, and so on, up through the memory index 186 indicating the memory location that stores data element A16. An A/L operation (OP) may be performed on the gathered or otherwise loaded data elements, and the data elements of the source packed data operand 516. The resulting data elements (i.e., those that result from the performance of the operation) may then be scattered or otherwise stored back to the corresponding memory locations indicated by the memory indices of the source packed memory indices operand. In some embodiments, depending upon the particular operations of the instruction, the result data elements may be the same size as the data elements of the source packed data operand (e.g., 32-bit data elements). Alternatively, the result data elements may be larger or smaller than the data elements of the source packed data operand, such as, for example, 8-bits, 16-bits, 64-bits, etc.

In the illustrated embodiment, for simplicity of description, a vertical type operation is performed to generate a first result data element equal to A1 OP B1, a second result data element equal to A2 OP B2, a third result data element equal to A3 OP B3, and a fourth result data element equal to A16 OP B16. While the term "equal to" has been used, it is to be appreciated that saturation may optionally be performed to saturate the values to maximum or minimum representable values. Any of the previously mentioned vertical type operations described elsewhere herein are suitable (e.g., packed add, packed subtract, packed multiply, packed shift, packed rotate, various different types of logical operations (e.g., AND, OR, NOT, AND NOT, etc.). As one example, in the case of the operation being packed addition, the result data elements may include A1+B1, A2+B2, A3+B3, up through A16+B16. As another example, in the case of the operation being packed shift, the result data elements may include A1 shifted by a shift count in B1, A2 shifted by a shift count in B2, and so on. In other embodiments, other types of operations, such as, for example, horizontal type operations, part vertical part horizontal type operations, operations involving more than two data elements, or the like, may optionally be performed. As shown in the illustration, the value of A1 in the memory location corresponding to the memory index 134 may be overwritten with the value of A1 OP B1, the value of A2 in the memory location corresponding to the memory index 231 may be overwritten with the value of A2 OP B2, the value of A3 in the memory location corresponding to the memory index 20 may be overwritten with the value of A3 OP B3, and the value of A16 in the memory location corresponding to the memory index 186 may be overwritten with the value of A16 OP B16.

Figure 6:
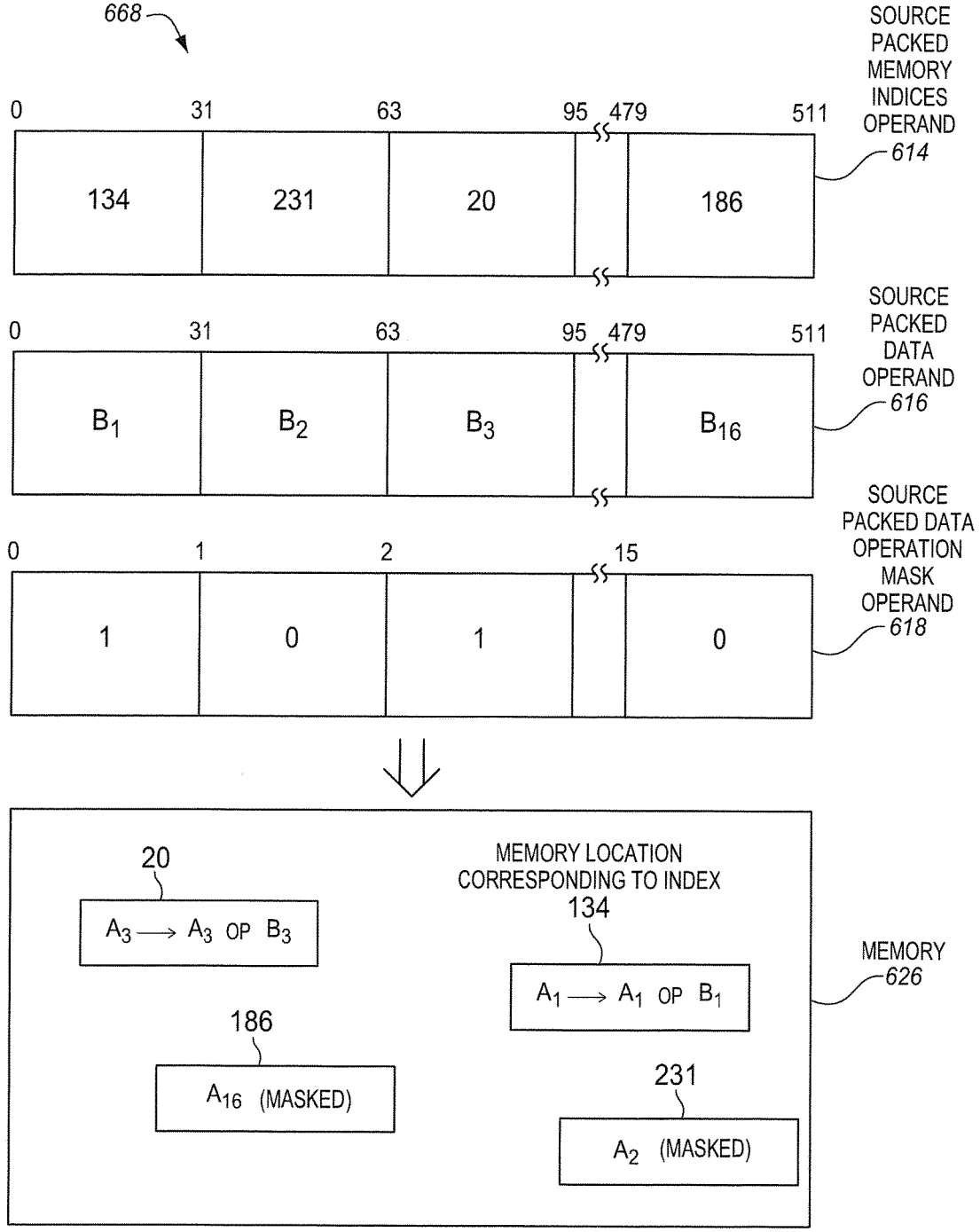
FIG. 6 is a block diagram illustrating an embodiment of a masked vector indexed load plus arithmetic and/or logical operation plus store operation.

FIG. 6 is a block diagram illustrating an embodiment of a masked vector indexed load operation plus A/L operation plus store operation 668 that may be performed in response to an embodiment of a masked vector indexed load plus A/L operation plus store instruction. In some embodiments, the instruction may represent a masked gather plus A/L operation plus scatter instruction. The masked operation and masked instruction of FIG. 6 have certain similarities to the unmasked operation and unmasked instruction of FIG. 5. To avoid obscuring the description, the different and/or additional characteristics for the masked operation/instruction of FIG. 6 will primarily be described without repeating all the similar or common characteristics relative to the unmasked operation/instruction of FIG. 5. However, it is to be appreciated that the previously described characteristics of the unmasked operation/instruction of FIG. 5 also optionally apply to FIG. 6 unless stated otherwise or otherwise apparent.

The instruction may specify or otherwise indicate a source packed memory indices operand 614 having a plurality of packed memory indices. The instruction may also specify or otherwise indicate a source packed data operand 616 having a plurality of packed data elements. Each of these may be similar to, or the same as, those previously described for FIG. 5, and may have the same variations and alternatives.

In some embodiments, the masked instruction may also specify or otherwise indicate a source packed data operation mask operand 618. The source packed data operation mask operand may represent a predicate operand, or conditional control operand, that is operable to mask, predicate, or conditionally control whether or not a corresponding set of operations associated with the instruction are to be performed and/or whether or not a corresponding result is to be stored. The packed data operation mask may also be referred to herein as an operation mask, predicate mask, or simply a mask. In some embodiments, the masking or predication may be at per-data element granularity so that operations on different data elements may be predicated or conditionally controlled separately and/or independently of others. The mask may include multiple mask elements, predicate elements, or conditional control elements. In one aspect, the elements of the mask may be included in a one-to-one correspondence with corresponding source data elements and/or result data elements. In some embodiments, each mask element may be a single mask bit. A value of each single mask bit may control whether or not a corresponding set of operations associated with the instruction are to be performed on corresponding data elements and/or whether or not a corresponding result is to be stored in a destination storage location. According to one possible convention, each mask bit may have a first value (e.g., may be set to binary 1) to allow the corresponding set of operations to be performed and allow a corresponding result data element to be stored in the corresponding destination storage location, or may have a second value (e.g., may be cleared to binary 0) to not allow the corresponding set of operations to be performed and/or not allow a corresponding result data element to be stored in the corresponding destination storage location.

As shown, in the case of the source packed memory indices operand 614 being 512-bits wide, and having sixteen 32-bit memory indices, the source packed data operation mask operand 618 may be 16-bits wide, with each bit representing a mask bit. Each mask bit may correspond to a memory index in a corresponding position and/or may correspond to the result data element to be stored in the associated memory location pointed to by the memory index. In the illustration the corresponding positions are vertically aligned relative to one another. In other embodiments, when there are more or less result data elements there may be more or less mask bits. For example, the mask may have a width in bits equal to the number of memory indices in the source packed memory indices 614 (e.g., four, eight, thirty two, sixty four, etc.). In the illustrated example, the mask bits, from least significant bit (on the left) to most significant bit (on the right), are 1, 0, 1, . . . 0. This is just one illustrative example. According to the illustrated convention, a mask bit value of binary 0 represents a masked out result element and/or set of operations that need not be performed, whereas a mask bit value of binary 1 indicates an unmasked result element and/or set of operations to be performed. For each unmasked element, the corresponding vector indexed load operation, A/L operation, and store operation are to be performed. In contrast, for each masked element, the corresponding vector indexed load operation, A/L operation, and store operation need not be performed, or if they are performed the associated result need not be stored in the associated memory location. Often, there are advantages of not even performing the masked out operations, such as, for example, an ability to avoid faults (e.g., page faults) on operations that do not need to be performed.

The masked vector indexed load operation, A/L operation, and store operation may be performed in response to and/or as a result of the embodiment of the masked instruction. In some embodiments, the set of operations (e.g., the load, A/L, and store operations) may or may not be performed on corresponding data elements subject to the conditional control of the mask bits. In some embodiments, data elements may be selectively gathered or otherwise loaded from the corresponding memory locations indicated by the corresponding memory indices only when the corresponding mask bits are unmasked (e.g., set to binary 1). The data elements corresponding to masked packed data operation mask bits (e.g., those cleared to binary 0) may not be loaded. Then, an A/L operation (OP) may be selectively performed only on the loaded data elements, and the appropriate data elements of the source packed data operand 616. Then, the resulting data elements may be selectively scattered or otherwise stored back to the corresponding memory locations indicated by the memory indices only when the corresponding mask bits are unmasked (e.g., set to binary 1).

In the illustrated example, since the mask bits in bit positions [0], and [2] of the source packed data operation mask are unmasked (e.g., set to binary 1), the value of A1 in the memory location corresponding to the memory index 134 may be overwritten with the value of A1 OP B1, and the value of A3 in the memory location corresponding to the memory index 20 may be overwritten with the value of A3 OP B3. In the illustrated embodiment, for simplicity of description, a vertical type operation is performed. Any of the previously described vertical type operations are suitable. In other embodiments, horizontal type operations, part vertical part horizontal type operations, operations involving more than two data elements, or the like, may be performed instead.

In the illustrated example, since the mask bits in bit positions [1] and [15] of the mask are masked out (e.g., cleared to binary 0), results of the set of operations associated with the instruction are not stored in the memory locations indicated by the corresponding memory indices. Rather, in some cases, these memory locations may retain or preserve their preexisting values before the instruction (e.g., may not be changed by the instruction). As shown, the memory location associated with memory index 231 may retain the initial value A1, and the memory location associated with memory index 186 may retain the initial value A16. Alternatively, zeroes or other predetermined values may be stored in the masked out memory locations.

FIG. 7 is a block diagram illustrating an embodiment of a vector indexed load plus A/L operation 770 that may be performed in response to an embodiment of a vector indexed load plus A/L operation instruction. In some embodiments, the instruction may represent a gather plus A/L operation instruction. The operation and instruction of FIG. 7 have certain similarities to the operation and instruction of FIG. 5. To avoid obscuring the description, the different and/or additional characteristics for the operation/instruction of FIG. 7 will primarily be described without repeating all the similar or common characteristics relative to the operation/instruction of FIG. 5. However, it is to be appreciated that the previously described characteristics of the operation/instruction of FIG. 5 also optionally apply to FIG. 7, unless stated or otherwise apparent.

The instruction may specify or otherwise indicate a source packed memory indices operand 714 having a plurality of packed memory indices. The instruction may also specify or otherwise indicate a source packed data operand 716 having a plurality of packed data elements. Each of these may be similar to, or the same as, those previously described for FIG. 5, and may have the same variations and alternatives.

The vector indexed load plus A/L operation may be performed in response to and/or as a result of the embodiment of the instruction. The operation may gather or otherwise load data elements from memory locations indicated by the corresponding memory indices of the source packed memory indices operand 714. For example, in the illustrated embodiment, the data element A1 may be gathered from the memory location indicated by the memory index 134, the data element A2 may be gathered from the memory location indicated by the memory index 231, the data element A3 may be gathered from the memory location indicated by the memory index 20, and so on up through the data element A16 being gathered from the memory location indicated by the memory index 186. Then, an A/L operation (OP) may be performed on the gathered or otherwise loaded data elements, and the appropriate data elements of the source packed data operand. This may generate a plurality of result data elements.

In contrast to the operation/instruction of FIG. 5, in this embodiment the result data elements may not be scattered or otherwise stored back to the memory 726. Rather, the result data elements may be stored in a result packed data operand in a storage location that is located on-die or on-processor. For example, in some embodiments, the result date elements may be stored in a result packed data in a packed data register of the processor. In some embodiments, the instruction may have a field or set of bits to explicitly specify the packed data register. Alternatively, the packed data register may optionally be implicitly indicated by the instruction. In other embodiments, temporary registers may be used to store the result packed data.

In the illustrated embodiment, for simplicity of description, a vertical type operation is performed to generate a first result data element equal to A1 OP B1, a second result data element equal to A2 OP B2, a third result data element equal to A3 OP B3, and a sixteenth result data element equal to A16 OP B16. Any of the previously mentioned vertical type operations described elsewhere herein are suitable. In other embodiments, other types of operations, such as, for example, horizontal type operations, part vertical part horizontal type operations, operations involving more than two data elements, or the like, may optionally be performed. The result data elements are stored in a result packed data operand 772 (e.g., in a packed data register). As shown, the first result data element is stored in bits [31:0], the second result data element is stored in bits [63:32], the third result data element is stored in bits [95:64], up through the sixteenth result data element being stored in bits [511:480]. In other embodiments, depending upon the particular operations of the instruction, the result data elements may be either larger or smaller than the data elements of the source packed data operand, such as, for example, 8-bits, 16-bits, 64-bits, etc.

FIG. 7 shows an embodiment of an unmasked operation/instruction. Other embodiments may include a corresponding masked operation/instruction. The masks and masking may be performed substantially as described above in conjunction with FIG. 6 with the exception that the results will be stored or not stored in the result packed data 772 instead of in the memory 726. The characteristics of the masks and masking previously described in conjunction with FIG. 6 may also apply to this instruction/operation.

In various embodiments, the operations of any of FIGS. 5-7 may be performed by and/or within the apparatus of any of FIGS. 1-3. The components, features, and specific optional details described herein for the apparatus of any of FIGS. 1-3 may also optionally apply to the operations of any of FIGS. 5-7. Alternatively, the operations of any of FIGS. 5-7 may be performed by and/or within a similar or different apparatus than those of FIGS. 1-3. Moreover, the apparatus of any of FIGS. 1-3 may perform operations that are the same as, similar to, or different than those of FIGS. 5-7. The operations of any of FIGS. 5-7 may also be performed as part of the method of FIG. 4. Alternatively, the method of FIG. 4 may perform similar or different operation than those of FIGS. 5-7.

The instructions disclosed herein are general-purpose instructions and may be used for various different purposes. To further illustrate certain concepts, consider the following detailed example. Consider the following loop:

```
FOR I = 1, N
    DATA[ INDEX[I] ] = DATA[ INDEX[I] ] + COUNT
```

Without the instructions disclosed herein, such a loop may be encoded in x86 instructions as follows:

```
MOV ZMM2, [ INDEX+RSI ]
GATHERDPS ZMM1, [ DATA + ZMM2 * SCALE ]
ADDPS ZMM1, ZMM1, ZMM3
SCATTERDPS [ DATA + ZMM2 * SCALE ], ZMM1
```

However, with an embodiment of a gather plus packed add plus scatter instruction, such a loop may be encoded more concisely as follows:

```
MOV ZMM2, [ INDEX+RSI ]
GATADDSCATDPS [ DATA + ZMM2 * SCALE ], ZMM3
```

Advantageously, this example illustrates that the gather plus packed add plus scatter instruction may help to eliminate or reduce some instructions, which may help to increase code density and increase performance. Moreover, performance gains may also be derived from reducing the overhead in the address generation and load/store handling for each element. As mentioned above, the actual performance gains may depend upon the location of the unit or circuitry in which the instruction is implemented in the pipeline. Generally, the closer the instruction is implemented to the memory, or conversely the farther from the highest level of cache in the system, the better the performance gains will be. As mentioned above, this may be due partly to avoiding needing to store data associated with the performance of the instruction in the highest or higher levels of cache, avoiding the need to transmit the data on interconnects to the highest or higher levels of cache, etc.

FIG. 8 is a block diagram of an embodiment of a format for a vector indexed load plus A/L operation plus store instruction 806. The instruction includes an operation code or opcode 880. The opcode may represent a plurality of bits or one or more fields that are operable to identify the type of instruction and/or operation to be performed. The instruction also includes a source packed memory indices field 881 that is operable to specify a source packed memory indices operand. The instruction also includes a source packed data field 882 that is operable to specify a source packed data operand. In some embodiments, the instruction may also optionally include a source packed data operation mask field 883 that is operable to specify a source packed data operation mask. In some embodiments, the instruction may also optionally include a source of memory addressing information field 885 to specify a source (e.g., a general-purpose register) having a base address or other memory address information. Alternatively, the instruction may implicitly indicate the register or other source having such memory addressing information.

FIG. 9 is a block diagram of an embodiment of a format for a vector indexed load plus A/L operation instruction 908. The instruction includes an operation code or opcode 980. The opcode may represent a plurality of bits or one or more fields that are operable to identify the type of instruction and/or operation to be performed. The instruction also includes a source packed memory indices field 981 that is operable to specify a source packed memory indices operand. The instruction also includes a source packed data field 982 that is operable to specify a source packed data operand. In some embodiments, the instruction may also optionally include a source packed data operation mask field 983 that is operable to specify a source packed data operation mask. The instruction may also include an optional destination packed data field 984 that is operable to specify destination packed data storage location. In some embodiments, the destination packed data storage location may be a packed data register or other on-die or on-processor storage location. In some embodiments, the instruction may also optionally include a source of memory addressing information field 985 to specify a source (e.g., a general-purpose register) having a base address or other memory address information. Alternatively, the instruction may implicitly indicate the register or other source having such memory addressing information.

In FIGS. 8-9 each of the various fields may include a set of bits sufficient to specify an address of a register or other storage location that has the operands. The bits of the fields may be contiguous and/or non-contiguous. In other embodiments, one or more of any of the various fields may be implicit to the instruction (e.g., implicitly indicated by the opcode of the instruction), instead of being explicitly specified through the field. Alternate embodiments may add additional fields or omit some of the fields. Further, the illustrated order/arrangement of the fields and is not required. Rather, the fields may be rearranged, certain fields may overlap, etc.

In some embodiments, the instruction format may follow an EVEX encoding or instruction format, although this is not required. EVEX encodings will be discussed further below. In one embodiment, two legacy prefixes may be used to override the behavior of escape 62. For example, a prefix F2 may imply the use of load-operation formatting and VSIB. In one embodiment, this prefix F2 may be used for a vector indexed load plus A/L operation instruction as disclosed elsewhere herein. A prefix F3 may imply the use of operation-store formatting and VSIB. In one embodiment, this prefix F3 may be used for a vector indexed load plus A/L operation plus store instruction as disclosed elsewhere herein. By way of example, for the VADDPS encoding:

EVEX.U1.NDS.512.0F.W0 58/r VADDPS zmm1, {k1}, zmm2, [rax]

A gather plus packed add instruction may be expressed as:

---

F2.EVEX.U1.NDS.512.0F.W0 58 /r and VGATHERADDPS zmm1, {k1},
zmm2, [rax+zmm3*scale]

---

A gather plus packed add plus scatter instruction may be expressed as:

---

F3.EVEX.U1.NDS.512.0F.W0 58 /r and VGATSCATADDPS [rax+zmm3*scale]
{k1}, zmm1, zmm2

---

The zmm1, zmm2, and zmm3 refer to 512-bit packed data registers. The {k1} represents a 64-bit mask register. The rax represents an integer general-purpose register used to hold memory addressing information. These are just illustrative examples of suitable encodings. The scope of the invention is not limited to these encodings.

To further illustrate certain concepts, consider a few examples of suitable packed data formats. A 128-bit packed word format is 128-bits wide and includes eight 16-bit wide word data elements. A 128-bit packed doubleword format is 128-bits and includes four 32-bit doubleword data elements. A 128-bit packed quadword format 846 is 128-bits and includes two 64-bit quadword data elements. A 256-bit packed word format is 256-bits wide and includes sixteen 16-bit wide word data elements. A 256-bit packed doubleword format 850 is 256-bits and includes eight 32-bit doubleword data elements. A 256-bit packed quadword format is 256-bits and includes four 64-bit quadword data elements. A 512-bit packed word format is 512-bits wide and includes thirty-two 16-bit wide word data elements. A 512-bit packed doubleword format is 512-bits and includes sixteen 32-bit doubleword data elements. A 512-bit packed quadword format is 512-bits and includes eight 64-bit quadword data elements. Other packed data formats may include packed 32-bit single precision floating point formats or packed 64-bit double precision floating point formats. Any other data element sizes (e.g., wider or narrower) that are suitable for gather and/or scatter instructions are also suitable. Moreover, wider or narrower packed data widths are also suitable, such as, for example, 64-bit packed data, 1024-bit packed data, etc. Generally, the number of packed data elements is equal to the size in bits of the packed data divided by the size in bits of the packed data elements.

Figure 10:
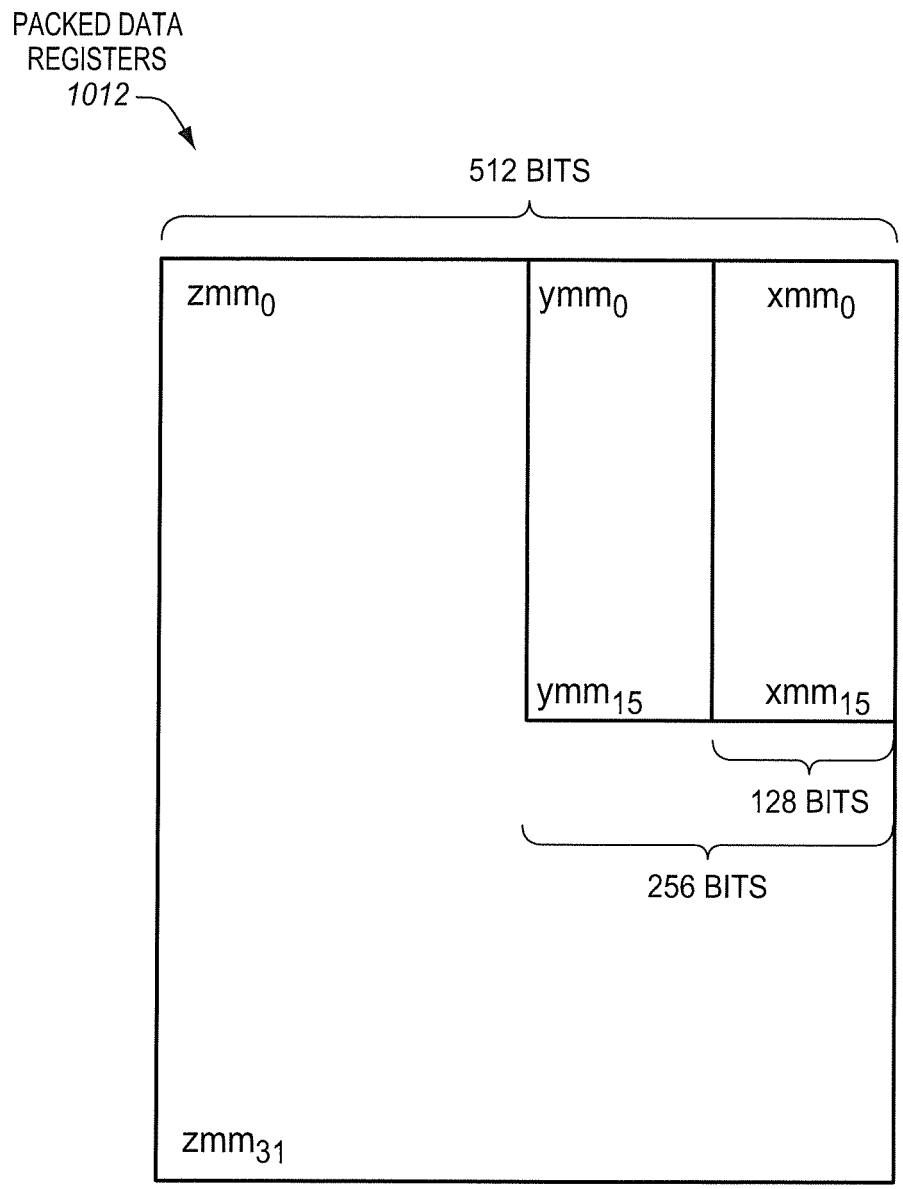
FIG. 10 is a block diagram of an example embodiment of a particular suitable set of packed data registers.

FIG. 10 is a block diagram of an example embodiment of a particular suitable set of packed data registers 1012. The illustrated packed data registers include thirty-two 512-bit packed data or vector registers. These thirty-two 512-bit registers are labeled ZMM0 through ZMM31. In the illustrated embodiment, the lower order 256-bits of the lower sixteen of these registers, namely ZMM0-ZMM15, are aliased or overlaid on respective 256-bit packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data, or 128-bit packed data. The 128-bit registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword, single precision floating point data, 64-bit quadword, and double precision floating point data. Alternate embodiments of suitable packed data registers may include different numbers of registers, different sizes of registers, may or may not alias larger registers on smaller registers, and may or may not also be used for floating point data.

Figure 11:
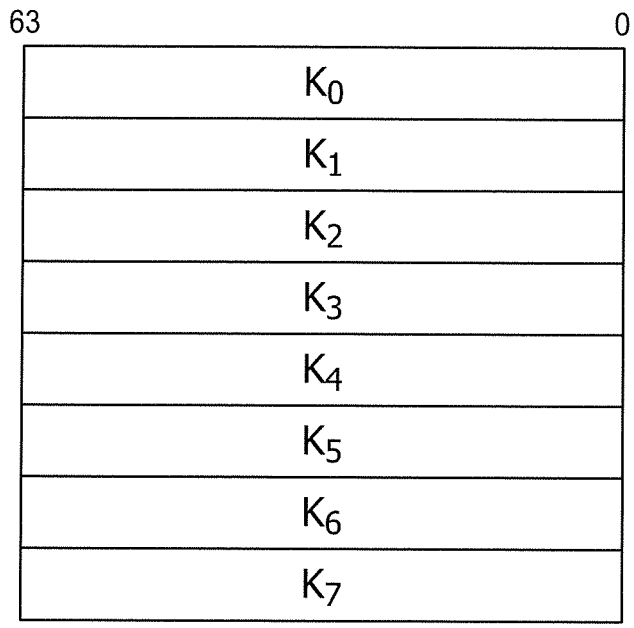
FIG. 11 is a block diagram of an example embodiment of a particular suitable set of packed data operation mask registers.

FIG. 11 is a block diagram of an example embodiment of a particular suitable set of packed data operation mask registers 1118. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). By way of example, an instruction may use three bits (e.g., a 3-bit field) to encode or specify any one of the eight packed data operation mask registers k0 through k7. In alternate embodiments, either fewer or more bits may be used when there are fewer or more packed data operation mask registers, respectively.

Figure 12:
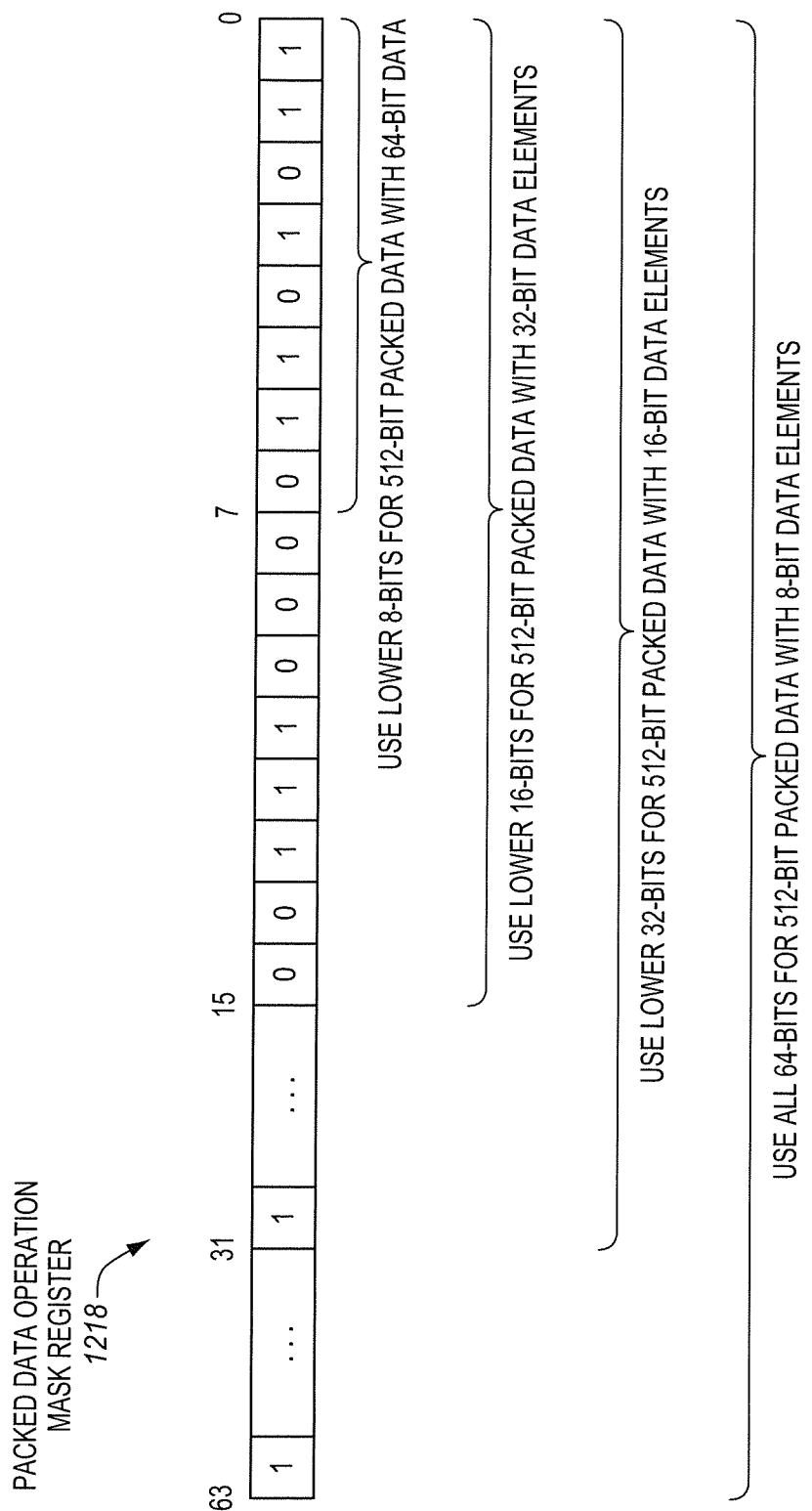
FIG. 12 is a diagram illustrating an example embodiment of a particular suitable 64-bit packed data operation mask register.

FIG. 12 is a diagram illustrating an example embodiment of a particular suitable 64-bit packed data operation mask register 1218, and illustrating that the number of bits used as a packed data operation mask and/or for masking depends upon the packed data width and the data element width. The illustrated mask register is 64-bits wide, although as mentioned above this is not required. Generally, when a single per-element masking control bit is used, the number of bits used for masking is equal to the packed data width in bits divided by the packed data element width in bits. To further illustrate, consider a few possible example embodiments. Only 8-bits, for example only the lower 8-bits, may be used for 256-bit packed data having 32-bit data elements. Only 16-bits, for example only the lower 16-bits, may be used either for 512-bit packed data having 32-bit data elements. Only 32-bits, for example only the lower 32-bits, may be used either for 1024-bit packed data having 32-bit data elements. All 64-bits-bits may be used for 1024-bit packed data having 16-bit data elements.

In the discussion above, vertical type vector operations have been emphasized to facilitate illustration and description, although the scope of the invention is not so limited. Any of the embodiments discussed herein utilizing a vertical type of vector operation may be modified to have another non-vertical type of vector operation (e.g., a part vertical and part horizontal operation, an operation on more than a pair of corresponding vertically aligned data elements, etc.).

In other embodiments, instead of the instructions involving a single arithmetic and/or logical operation (e.g., a packed multiplication or a packed addition operation), an embodiment of an instruction may involve multiple different arithmetic and/or logical operations to be performed sequentially. For example, after a vector indexed load, a first arithmetic and/or logical operation may be performed as described elsewhere herein, then a second arithmetic and/or logical operation may optionally be performed on the results of the first arithmetic and/or logical operation and potentially other data, and then the results of the second arithmetic and/or logical operation may be stored to memory.

Components, features, and details described for any of FIGS. 3 and 5-12 may also optionally be used in any of FIGS. 1-2 and 4. Moreover, components, features, and details described herein for any of the apparatus may also optionally be used in any of the methods described herein, which in embodiments may be performed by and/or with such the apparatus.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
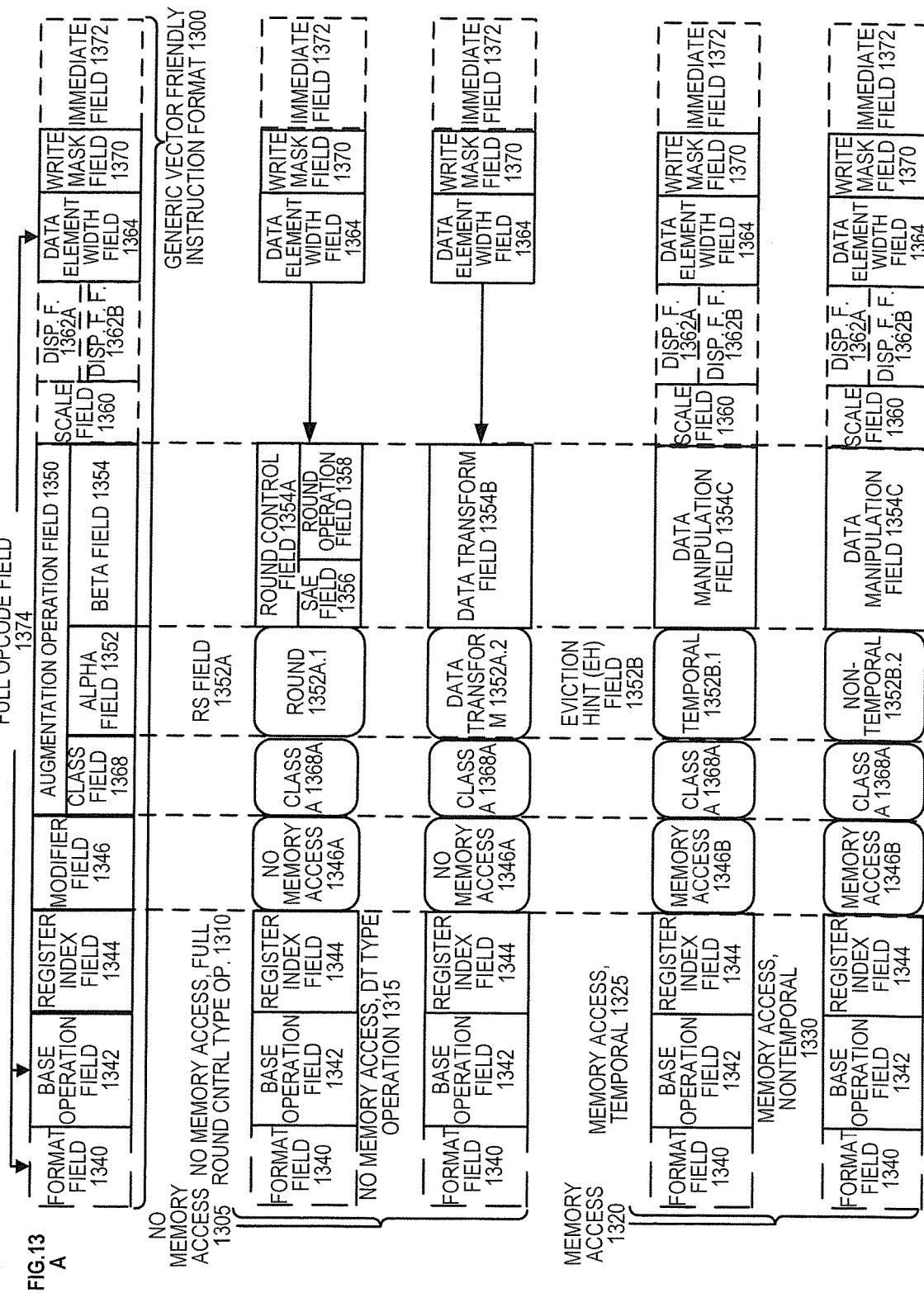

FIGS. 13A-13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*\text{index}+\text{base}$).

Displacement Field 1362A—its content is used as part of memory address generation (e.g., for address generation that uses $2^{scale}*\text{index}+\text{base}+\text{displacement}$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14A is a block diagram illustrating an exemplary specific vector friendly instruction format according to embodiments of the invention. FIG. 14A shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 13 into which the fields from FIG. 14 map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]-R), EVEX.X bit field (EVEX byte 1, bit [6]-X), and 1357BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)—its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.U=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
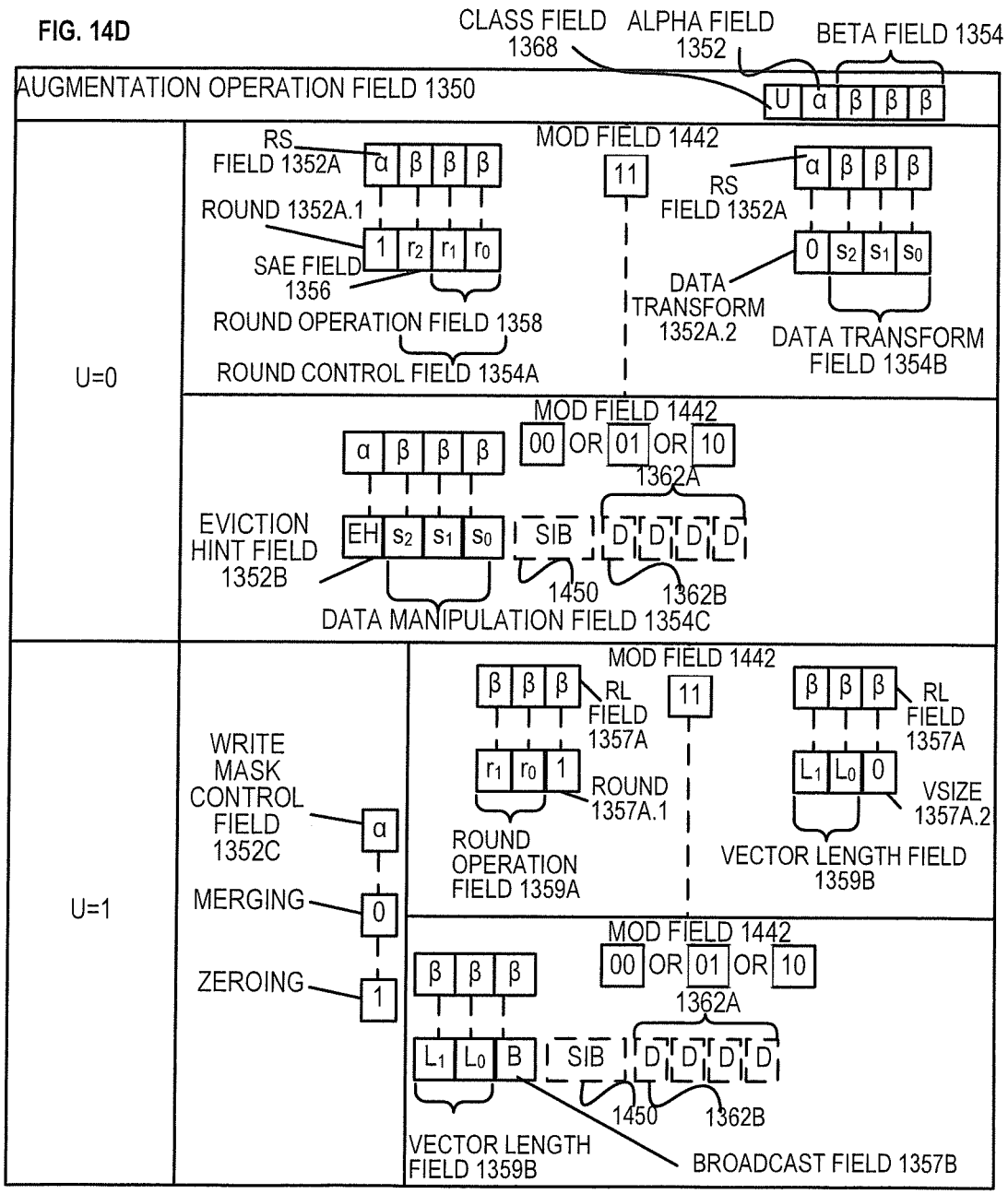
FIG. 14D is a block diagram illustrating the fields of the specific vector friendly instruction format that make up the augmentation operation field according to one embodiment of the invention.

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-$S_0$) is interpreted as the RL field 1357A; when it contains a 1 (round 1357A.1) the rest of the beta field 1354 (EVEX byte 3, bit [6-5]-$S_{2-1}$) is interpreted as the round operation field 1359A, while when the RL field 1357A contains a 0 (VSIZE 1357.A2) the rest of the beta field 1354 (EVEX byte 3, bit [6-5]-$S_{2-1}$) is interpreted as the vector length field 1359B (EVEX byte 3, bit [6-5]-$L_{1-0}$). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-$L_{1-0}$) and the broadcast field 1357B (EVEX byte 3, bit [4]-B).

Exemplary Register Architecture

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 17B:
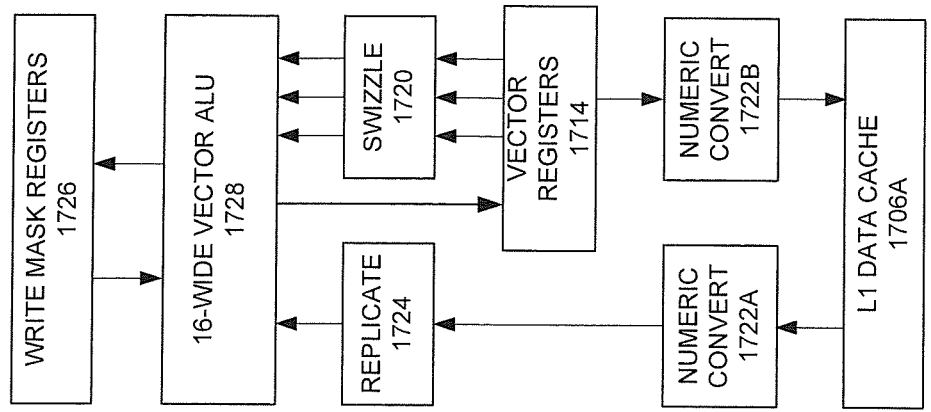
FIG. 17B is an expanded view of part of the processor core in FIG. 17A according to embodiments of the invention.
Figure 17A:
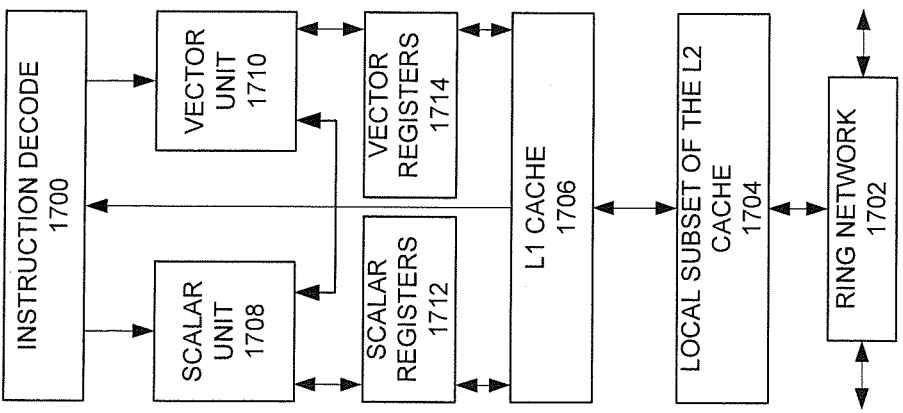
FIG. 17A is a block diagram of a single processor core, along with its connection to the on-die interconnect network and with its local subset of the Level 2 (L2) cache, according to embodiments of the invention.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
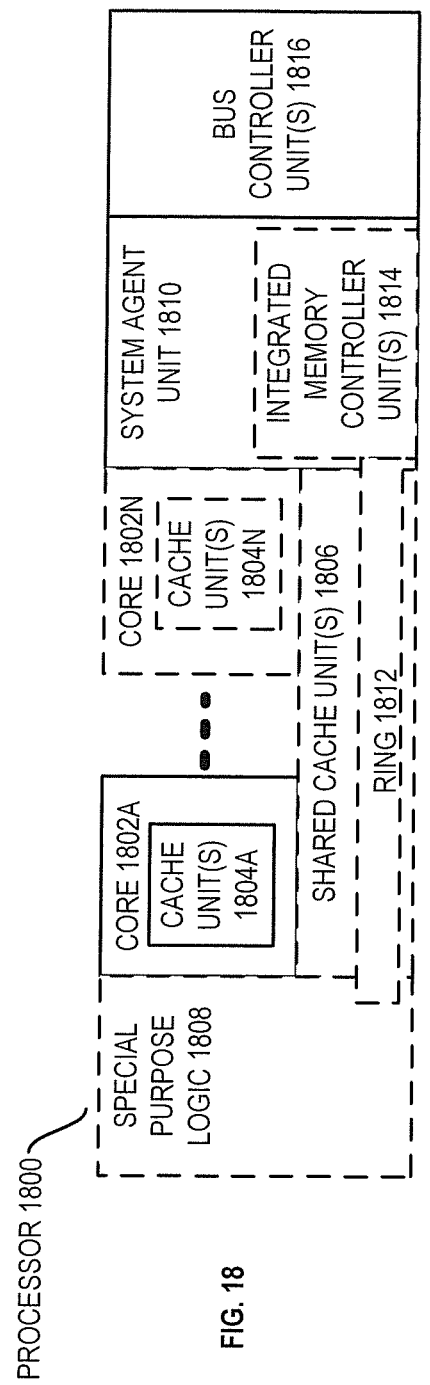
FIG. 18 is a block diagram of a processor that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
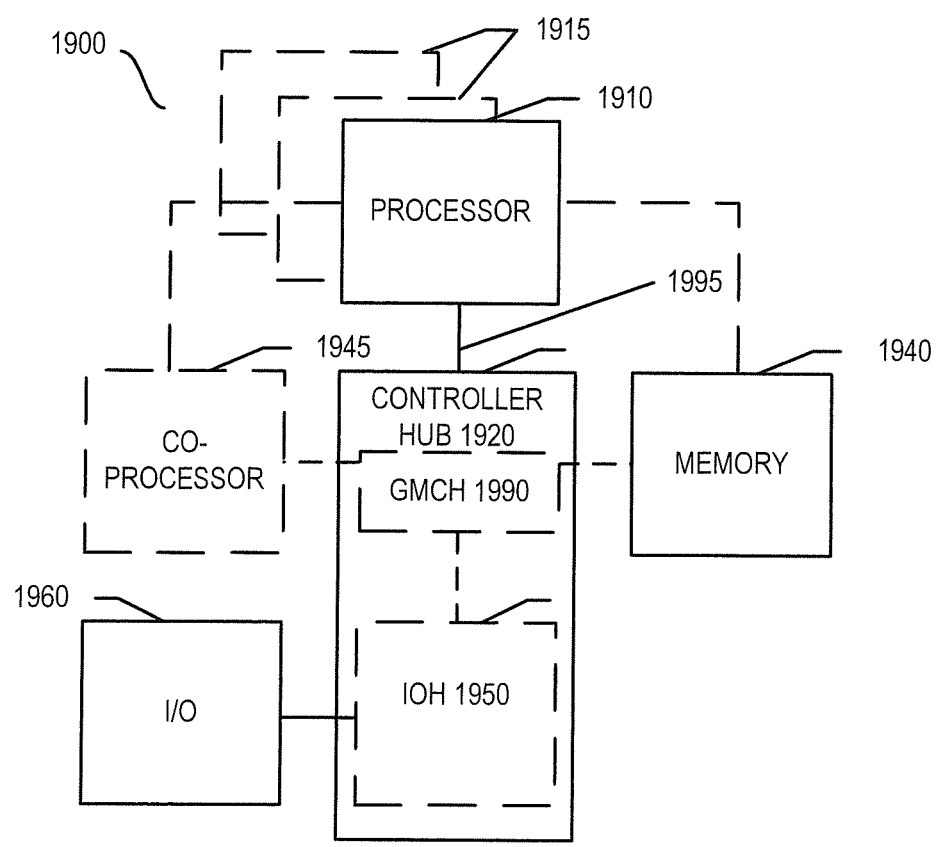
FIG. 19 shown is a block diagram of a system in accordance with one embodiment of the present invention.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
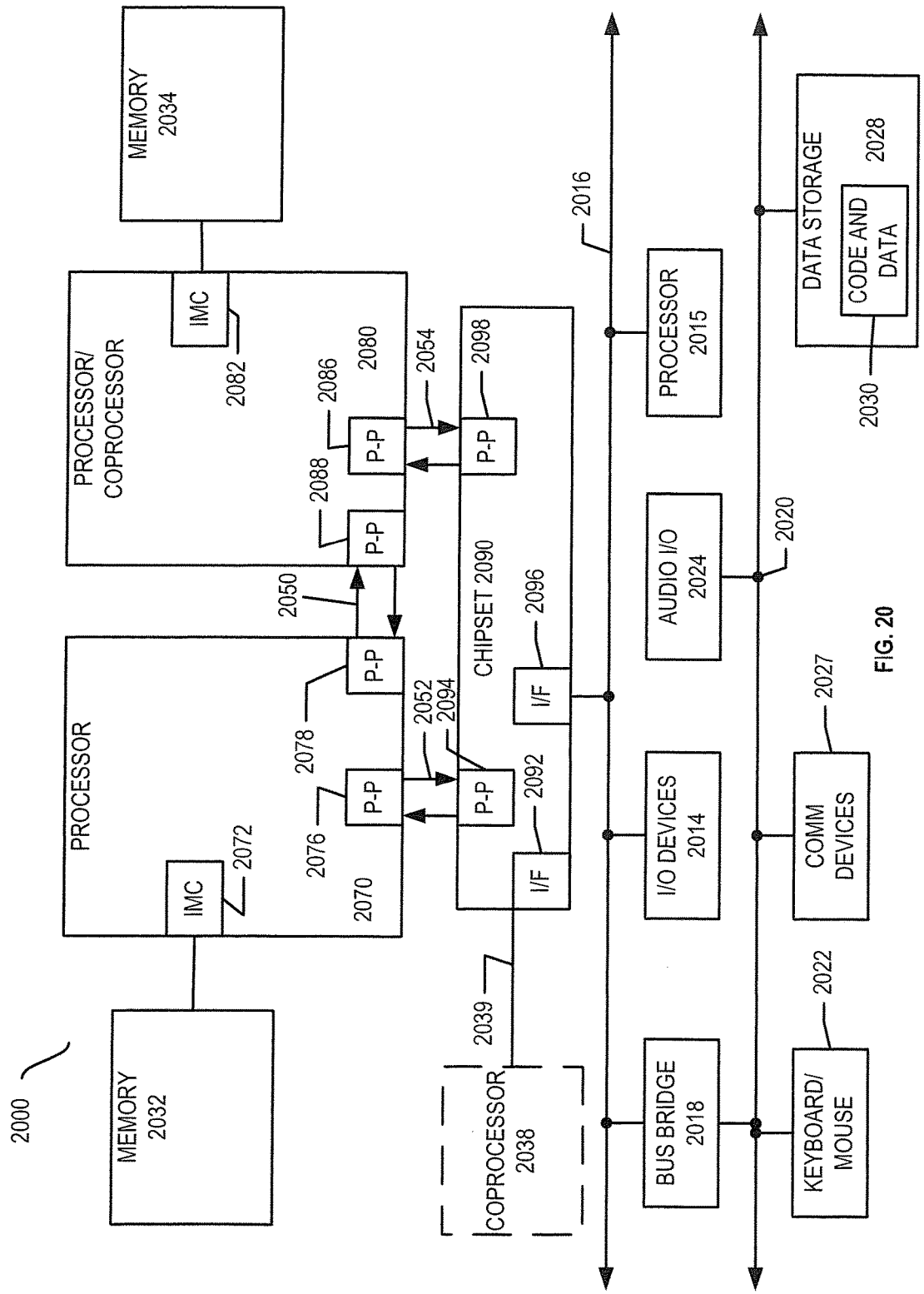
FIG. 20 shown is a block diagram of a first more specific exemplary system in accordance with an embodiment of the present invention.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
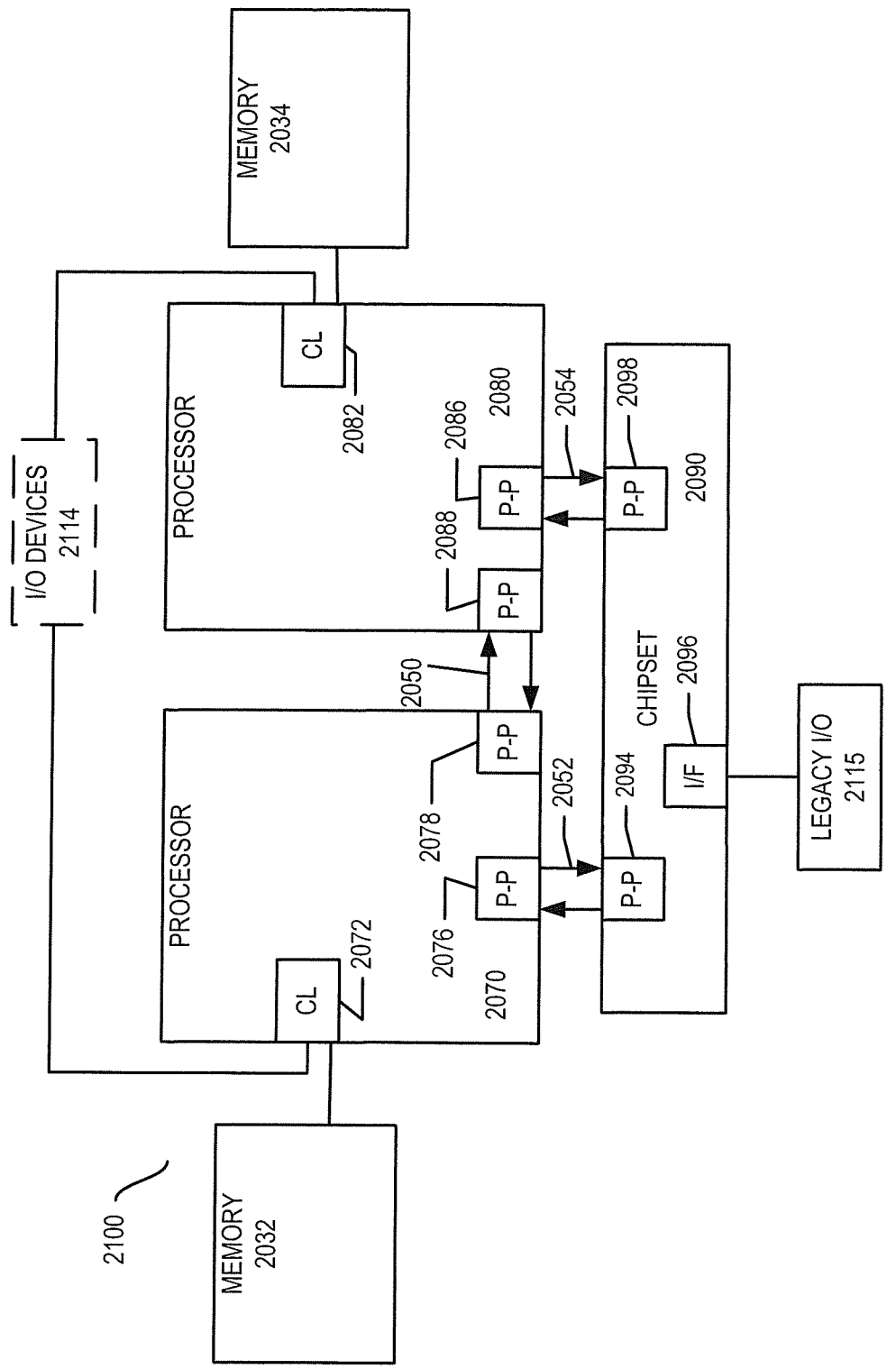
FIG. 21 shown is a block diagram of a second more specific exemplary system in accordance with an embodiment of the present invention.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
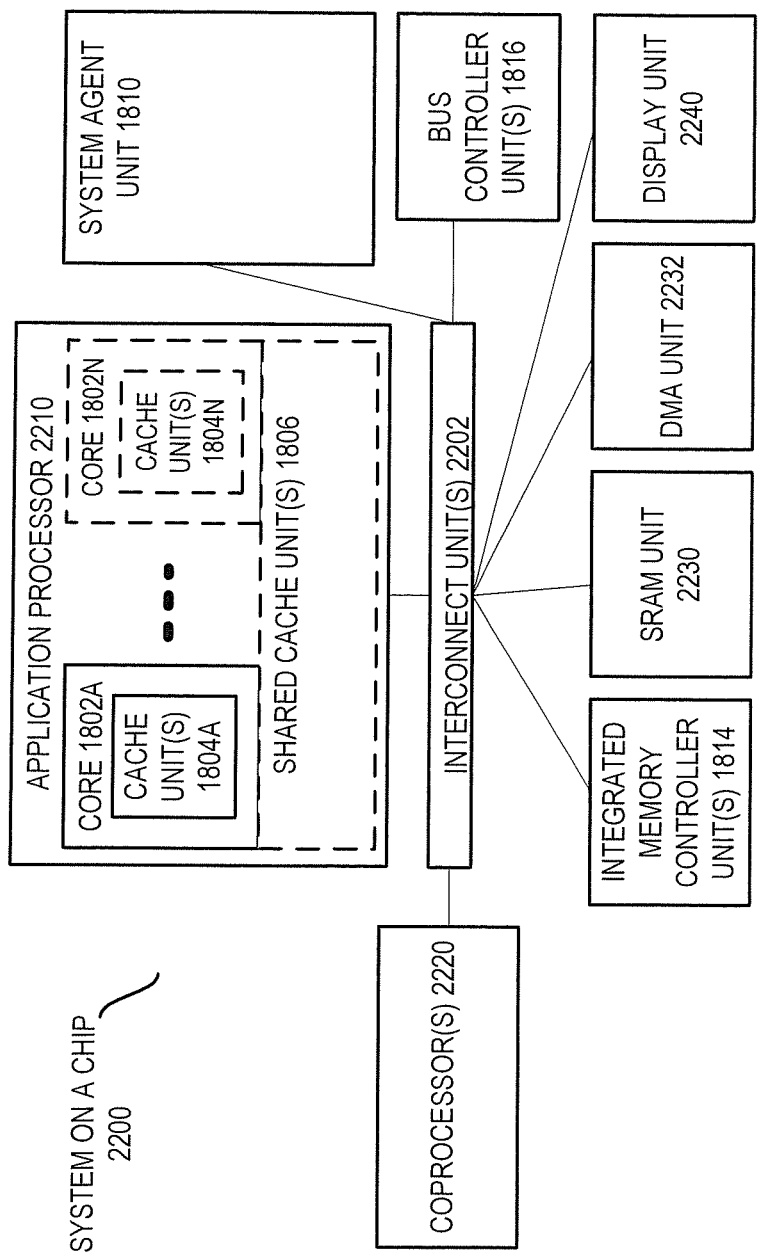
FIG. 22 shown is a block diagram of a SoC in accordance with an embodiment of the present invention.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, a decode unit may be coupled with an execution unit and/or a register through one or more intervening components. In the figures, arrows are used to show couplings and/or connections.

In the description and/or claims, the term "logic" may be used. The logic may include hardware, firmware, software, or various combinations thereof. Examples of logic include integrated circuitry, application specific integrated circuits, analog circuits, digital circuits, programmed logic devices, memory devices including instructions, and the like, and combinations thereof. In some embodiments, logic may include transistors and/or gates and/or other circuitry components. In various embodiments, the logic may also be referred to and/or represent a module, unit, component, circuit, logic device, or the like.

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. In some cases, where multiple components have been shown and described, they may instead be incorporated into a single component. In some cases, where a single component has been shown and described, it may be separated into two or more components.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) operable to execute and/or process the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal (e.g., a carrier wave).

Examples of suitable machines include, but are not limited to, general-purpose processors, special-purpose processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor that includes a decode unit to receive a vector indexed load plus A/L operation plus store instruction. The vector indexed load plus A/L operation plus store instruction is to indicate a source packed memory indices operand that is to have a plurality of packed memory indices, and is to indicate a source packed data operand that is to have a plurality of packed data elements. An execution unit is coupled with the decode unit. The execution unit, in response to the vector indexed load plus A/L operation plus store instruction, is to load a plurality of data elements from memory locations corresponding to the plurality of packed memory indices, is to perform A/L operations on the plurality of packed data elements of the source packed data operand and the loaded plurality of data elements, and is to store a plurality of result data elements in the memory locations corresponding to the plurality of packed memory indices.

Example 2 includes the processor of Example 1 and optionally in which the instruction comprises a gather plus A/L operation plus scatter instruction.

Example 3 includes the processor of any preceding example and optionally in which the A/L operations comprise at least one of packed addition operations, packed subtraction operations, packed multiplication operations, packed division operations, packed multiply-add operations, packed shift operations, packed rotate operations, packed logical AND operations, packed logical OR operations, packed logical NOT operations, and packed logical AND NOT operations.

Example 4 includes the processor of any preceding example and optionally in which the A/L operations comprise at least one of packed addition operations and packed multiplication operations.

Example 5 includes the processor of any preceding example and optionally in which the processor performs the vector indexed load plus A/L operation plus store instruction without transferring the loaded data elements into a core.

Example 6 includes the processor of any preceding example and optionally in which the execution unit is in an uncore portion of the processor within a memory subsystem.

Example 7 includes the processor of any preceding example and optionally in which the decode unit is within a core, and in which the execution unit is closer to a last level cache than to a core having the decode unit.

Example 8 includes the processor of any preceding example and optionally in which a portion of the execution unit that is to perform the A/L operations is to receive the loaded data elements from one of a last level of cache and a next to last level of cache.

Example 9 includes the processor of any preceding example and optionally in which the decode unit is to decode the vector indexed load plus A/L operation plus store instruction which is a masked vector indexed load plus A/L operation plus store instruction that indicates a source packed data operation mask operand.

Example 10 includes the processor of any preceding example and optionally in which the decode unit is to decode the vector indexed load plus A/L operation plus store instruction that is to indicate the source packed data operand that is at least 512-bits wide.

Example 11 is a method in a processor that includes receiving a vector indexed load plus A/L operation plus store instruction. The vector indexed load plus A/L operation plus store instruction indicates a source packed memory indices operand that is to have a plurality of packed memory indices, and indicates a source packed data operand that is to have a plurality of packed data elements. The vector indexed load plus A/L operation plus store instruction is performed. This may include loading a plurality of data elements from memory locations corresponding to the plurality of packed memory indices. A/L operations may be performed on the plurality of packed data elements of the source packed data operand and the loaded plurality of data elements. A plurality of result data elements may be stored in the memory locations corresponding to the plurality of packed memory indices.

Example 12 includes the method of Example 11 and optionally in which receiving comprises receiving a gather plus A/L operation plus scatter instruction.

Example 13 includes the method of any preceding example and optionally in which performing the A/L operations comprises performing at least one of packed addition operations, packed subtraction operations, packed multiplication operations, packed division operations, packed multiply-add operations, packed shift operations, packed rotate operations, packed logical AND operations, packed logical OR operations, packed logical NOT operations, and packed logical AND NOT operations.

Example 14 includes the method of any preceding example and optionally in which performing the A/L operations comprises performing at least one of packed addition operations and packed multiplication operations.

Example 15 includes the method of any preceding example and optionally in which performing the vector indexed load plus A/L operation plus store instruction completes without transferring the loaded data elements into a core.

Example 16 includes the method of any preceding example and optionally in which performing the A/L operations is performed by a unit in an uncore portion of the processor within a memory subsystem, and in which the unit is closer to a last level cache than to a core into which the instruction was received.

Example 17 includes the method of any preceding example and optionally in which receiving comprises receiving a masked vector indexed load plus A/L operation plus store instruction that indicates a source packed data operation mask operand.

Example 18 includes the method of any preceding example and optionally in which receiving comprises receiving the instruction indicating the source packed data operand that is at least 512-bits wide.

Example 19 is a system to process instructions that includes an interconnect, a dynamic random access memory (DRAM) coupled with the interconnect, and a processor coupled with the interconnect. The processor to receive a vector indexed load plus A/L operation plus store instruction that is to indicate a source packed memory indices operand that is to have a plurality of packed memory indices, and that is to indicate a source packed data operand that is to have a plurality of packed data elements. The processor is operable, in response to the vector indexed load plus A/L operation plus store instruction, to load a plurality of data elements from memory locations in the DRAM corresponding to the plurality of packed memory indices, to perform A/L operations on the plurality of packed data elements of the source packed data operand and the loaded plurality of data elements, and to store a plurality of result data elements in destination storage locations.

Example 20 includes the system of Example 19 and optionally in which the destination storage locations comprise the memory locations corresponding to the plurality of packed memory indices in the DRAM.

Example 21 includes the system of any preceding example and optionally in which the instruction comprises a gather plus A/L operation plus scatter instruction.

Example 22 is an article of manufacture that includes a non-transitory machine-readable storage medium. The machine-readable storage medium stores a vector indexed load plus A/L operation plus store instruction. The vector indexed load plus A/L operation plus store instruction is to indicate a source packed memory indices operand that is to have a plurality of packed memory indices, and is to indicate a source packed data operand that is to have a plurality of packed data elements. The vector indexed load plus A/L operation plus store instruction if executed by a machine operable to cause the machine to perform operations including loading a plurality of data elements from memory locations corresponding to the plurality of packed memory indices, performing A/L operations on the plurality of packed data elements of the source packed data operand and the loaded plurality of data elements, and storing a plurality of result data elements in destination storage locations.

Example 23 includes the article of manufacture of Example 22 and optionally in which storing the result data elements in the destination storage locations comprises storing the result data elements in the memory locations corresponding to the packed memory indices.

Example 24 includes the article of manufacture of any preceding example and optionally in which the instruction comprises a gather plus A/L operation plus scatter instruction.

Example 25 includes the article of manufacture of any preceding example and optionally in which performing the A/L operations comprises performing at least one of packed addition operations and the packed multiplication operations.

Example 26 includes the article of manufacture of any preceding example and optionally further including completing performance of the vector indexed load plus A/L operation plus store instruction without transferring the loaded data elements into a core of a processor.

Example 27 includes a processor or other apparatus that is configured and/or operable to perform the method of any of Examples 11-18.

Example 28 includes a processor or other apparatus that includes means for performing the method of any of Examples 11-18.

Example 29 includes a computer system including a processor and optionally including at least one of a dynamic random access memory (DRAM), a network processor, a graphics processor, a wireless communications chip, the processor is configured and/or operable to perform the method of any of Examples 11-18.

Example 30 includes a non-transitory machine-readable storage medium storing an instruction that if and/or when executed by a machine is operable to cause the machine to perform the method of any of Examples 11-18.

Example 31 includes a processor or other apparatus to perform one or more operations or any method substantially as described herein.

Example 32 includes a processor or other apparatus including means for performing one or more operations or any method substantially as described herein.

Example 33 includes a processor or other apparatus to perform any of the instructions described herein.

Example 34 includes a processor or other apparatus including means for performing any of the instructions described herein.

Example 35 includes a processor comprising means for receiving a vector indexed load plus arithmetic and/or logical (A/L) operation plus store instruction. The vector indexed load plus A/L operation plus store instruction indicating a source packed memory indices operand that is to have a plurality of packed memory indices, and indicating a source packed data operand that is to have a plurality of packed data elements. The processor includes means for performing the vector indexed load plus A/L operation plus store instruction including means for loading a plurality of data elements from memory locations corresponding to the plurality of packed memory indices. Means for performing A/L operations on the plurality of packed data elements of the source packed data operand and the loaded plurality of data elements. Means for storing a plurality of result data elements in the memory locations corresponding to the plurality of packed memory indices.

Example 36 includes the processor of Example 35 wherein the means for receiving comprises means for receiving a gather plus A/L operation plus scatter instruction.

What is claimed is:

1. A processor comprising:
   a decode unit to decode a vector indexed load plus arithmetic/logical (A/L) operation plus store instruction that has a single opcode, the vector indexed load plus A/L operation plus store instruction to indicate a source packed memory indices operand that is to have a plurality of packed memory indices, and to indicate a source packed data operand that is to have a plurality of packed data elements; and
   an execution unit coupled with the decode unit, the execution unit, in response to the vector indexed load plus A/L operation plus store instruction, to load a plurality of data elements from memory locations corresponding to the plurality of packed memory indices, to perform A/L operations on the plurality of packed data elements of the source packed data operand and the loaded plurality of data elements, and to store a plurality of result data elements in the memory locations corresponding to the plurality of packed memory indices.

2. The processor of claim 1, wherein the instruction comprises a gather plus A/L operation plus scatter instruction.

3. The processor of claim 1, wherein the A/L operations comprise at least one of packed addition operations, packed subtraction operations, packed multiplication operations, packed division operations, packed multiply-add operations, packed shift operations, packed rotate operations, packed logical AND operations, packed logical OR operations, packed logical NOT operations, and packed logical AND NOT operations.

4. The processor of claim 1, wherein the A/L operations comprise at least one of packed addition operations and packed multiplication operations.

5. The processor of claim 1, wherein the processor is to perform the vector indexed load plus A/L operation plus store instruction without transferring the loaded data elements into a core.

6. The processor of claim 1, wherein the execution unit is in an uncore portion of the processor within a memory subsystem.

7. The processor of claim 6, wherein the decode unit is within a core, and wherein the execution unit is closer to a last level cache than to the core having the decode unit.

8. The processor of claim 1, wherein a portion of the execution unit that is to perform the A/L operations is to receive the loaded data elements from one of a last level of cache and a next to last level of cache.

9. The processor of claim 1, wherein the decode unit is to decode the vector indexed load plus A/L operation plus store instruction which is to be a masked vector indexed load plus A/L operation plus store instruction that is to indicate a source packed data operation mask operand.

10. The processor of claim 1, wherein the decode unit is to decode the vector indexed load plus A/L operation plus store instruction that is to indicate the source packed data operand that is at least 512-bits wide.

11. A method in a processor comprising:
receiving a vector indexed load plus arithmetic/logical (A/L) operation plus store instruction having a single opcode, the vector indexed load plus A/L operation plus store instruction indicating a source packed memory indices operand having a plurality of packed memory indices, and indicating a source packed data operand having a plurality of packed data elements; and
performing the vector indexed load plus A/L operation plus store instruction including:
loading a plurality of data elements from memory locations corresponding to the plurality of packed memory indices;
performing A/L operations on the plurality of packed data elements of the source packed data operand and the loaded plurality of data elements; and
storing a plurality of result data elements in the memory locations corresponding to the plurality of packed memory indices.

12. The method of claim 11, wherein receiving comprises receiving a gather plus A/L operation plus scatter instruction.

13. The method of claim 11, wherein performing the A/L operations comprises performing at least one of packed addition operations, packed subtraction operations, packed multiplication operations, packed division operations, packed multiply-add operations, packed shift operations, packed rotate operations, packed logical AND operations, packed logical OR operations, packed logical NOT operations, and packed logical AND NOT operations.

14. The method of claim 11, wherein performing the A/L operations comprises performing at least one of packed addition operations and packed multiplication operations.

15. The method of claim 11, wherein performing the vector indexed load plus A/L operation plus store instruction completes without transferring the loaded data elements into a core.

16. The method of claim 11, wherein performing the A/L operations is performed by a unit in an uncore portion of the processor within a memory subsystem, and wherein the unit is closer to a last level cache than to a core into which the instruction was received.

17. The method of claim 11, wherein receiving comprises receiving a masked vector indexed load plus A/L operation plus store instruction that indicates a source packed data operation mask operand.

18. The method of claim 11, wherein receiving comprises receiving the instruction indicating the source packed data operand that is at least 512-bits wide.

19. A system to process instructions comprising:
an interconnect;
a dynamic random access memory (DRAM) coupled with the interconnect; and
a processor coupled with the interconnect, the processor to receive a vector indexed load plus arithmetic/logical (A/L) operation plus store instruction having a single opcode and that is to indicate a source packed memory indices operand that is to have a plurality of packed memory indices, and that is to indicate a source packed data operand that is to have a plurality of packed data elements, the processor operable, in response to the vector indexed load plus A/L operation plus store instruction to load a plurality of data elements from memory locations in the DRAM corresponding to the plurality of packed memory indices, to perform A/L operations on the plurality of packed data elements of the source packed data operand and the loaded plurality of data elements, and to store a plurality of result data elements in destination storage locations.

20. The system of claim 19, wherein the destination storage locations comprise the memory locations corresponding to the plurality of packed memory indices in the DRAM.

21. The system of claim 19, wherein the instruction comprises a gather plus A/L operation plus scatter instruction.

22. An article of manufacture comprising a non-transitory machine-readable storage medium, the non-transitory machine-readable storage medium storing instructions including a vector indexed load plus arithmetic/logical (A/L) operation plus store instruction having a single opcode,
the vector indexed load plus A/L operation plus store instruction to indicate a source packed memory indices operand that is to have a plurality of packed memory indices, and to indicate a source packed data operand that is to have a plurality of packed data elements, the vector indexed load plus A/L operation plus store instruction if executed by a machine is to be operable to cause the machine to perform operations comprising:
load a plurality of data elements from memory locations corresponding to the plurality of packed memory indices;
perform A/L operations on the plurality of packed data elements of the source packed data operand and the loaded plurality of data elements; and
store a plurality of result data elements in destination storage locations.

23. The article of manufacture of claim 22, wherein to store the result data elements in the destination storage locations comprises to store the result data elements in the memory locations corresponding to the packed memory indices.

24. The article of manufacture of claim 22, wherein the instruction comprises a gather plus A/L operation plus scatter instruction.

25. The article of manufacture of claim 22, wherein to perform the A/L operations comprises to perform at least one of packed addition operations and packed multiplication operations.

* * * * *